United States Patent [19]

Sandorfi

[11] Patent Number: 5,768,530
[45] Date of Patent: Jun. 16, 1998

[54] HIGH SPEED INTEGRATED CIRCUIT INTERFACE FOR FIBRE CHANNEL COMMUNICATIONS

[75] Inventor: Miklos A. Sandorfi, Foxboro, Mass.

[73] Assignee: EMC Corporation, Hokinton, Mass.

[21] Appl. No.: 580,508

[22] Filed: Dec. 28, 1995

[51] Int. Cl.$^6$ .......................... G06F 51/17; G06F 13/12
[52] U.S. Cl. .................. 395/200.63; 395/185.04; 395/842; 395/856
[58] Field of Search .................. 395/825, 830, 395/250, 200.63, 856, 427, 864, 842, 185.04

[56] References Cited

U.S. PATENT DOCUMENTS

| | | | |
|---|---|---|---|
| 5,136,582 | 8/1992 | Firoozmand | 370/85.1 |
| 5,185,736 | 2/1993 | Tyrrell et al. | 370/55 |
| 5,260,933 | 11/1993 | Rouse | 370/14 |
| 5,271,009 | 12/1993 | Takano et al. | 370/94.1 |
| 5,291,486 | 3/1994 | Koyanagi | 370/84 |
| 5,404,361 | 4/1995 | Casorso et al. | 371/40.1 |
| 5,553,302 | 9/1996 | Morrissey et al. | 395/825 |
| 5,598,541 | 1/1997 | Malladi | 395/286 |

Primary Examiner—Thomas C. Lee
Assistant Examiner—Rehana Perveen
Attorney, Agent, or Firm—Pearson & Pearson

[57] ABSTRACT

An application specific circuit for acting as an interface between a data processing system and a high speed data channel. A single integrated circuit includes an interface circuit for transferring data to and from a high speed data channel such as a fibre channel that transfers information in frames according to specific protocols. A frame processing circuit receives and transmits data frames according to the protocol and processes incoming data frames to facilitate subsequent handling. A sequence management circuit transfers data frames to and from a local memory system. When data frames are received out of order, the sequence management circuit provides a mechanism for establishing the appropriate order. The sequence management circuitry initially includes circuitry for transferring data between the local memory system and a data processing system. Both the local memory system and the data processing system are external to the application specific integrated circuit.

28 Claims, 23 Drawing Sheets

| INITIATOR | DATA | SOURCE | DESTINATION |
|---|---|---|---|
| FRAME RECEPTION 50 | RECEIVED FRAME DATA | RECEIVED DATA FIFO 52 | LOCAL MEMORY 16 |
| MEMORY TRANSFER CIRCUITRY 62 | RECEIVED FRAME DATA | LOCAL MEMORY 16 | DATA SYSTEM 15 |
| RECIPIENT SEQUENCE MANAGER 60 | REASSEMBLY DATA | REGISTERS | LOCAL MEMORY 16 |
| RECIPIENT CACHE MANAGER 61 | RECIPIENT CONTROL BLOCK | LOCAL MEMORY 16 | REGISTERS |
| INITIATOR SEQUENCE MANAGER 64 | INITIATOR CONTROL BLOCK | REGISTERS | LOCAL MEMORY 16 |
| INITIATOR CACHE MANAGER 65 | INITIATOR CONTROL BLOCK | LOCAL MEMORY 16 | REGISTERS |
| MEMORY TRANSFER CIRCUITRY 62 | TRANSMITTED FRAME DATA | DATA SYSTEM 15 | LOCAL MEMORY 16 |
| FRAME TRANSMISSION 55 | TRANSMITTED FRAME DATA | LOCAL MEMORY 16 | TRANSMITTED DATA FIFO 57 |

FIG. 15

HIGH SPEED INTEGRATED CIRCUIT INTERFACE FOR FIBRE CHANNEL COMMUNICATIONS

CROSS-REFERENCE TO RELATED APPLICATIONS

This application incorporates by reference the following copending applications for United States Letters Patent:

United States Letters Patent application Ser. No. [EMC 95-005] filed Nov. 7, 1995 for Buffer System.

United States Letters Patent application Ser. No. 08/363,392 filed Dec. 22, 1994 (now U.S. Pat. No. 5,590,122) for Method and Apparatus for Reordering Frames.

United States Letters Patent application Ser. No. 08/474,235 filed Jun. 7, 1995 (now abandoned) for Communications Arrangement for Networked Digital Data Processing System.

United States Letters Patent application Ser. No. 08/433,086 filed May 3, 1995 (now abandoned) for Dynamic Mode Sharing Apparatus and Techniques.

BACKGROUND OF THE INVENTION

1. Field of the Invention

This invention relates to interfaces for interposition between data channels having diverse characteristics and more particularly to an interface that is adapted for construction as a single integrated circuit component.

2. Description of Related Art

In a data processing systems and particularly data networks information transfers over serial and parallel buses between systems, and an interface exists to provide compatibility between a data processing system and the bus to which it connects. Moreover in some networks there is a need for providing an interface between diverse buses with different characteristics. As an example, an interface may couple a data processing system PCI bus and a fibre channel that is part of a fibre network as an example of a high speed data channel. The PCI bus operates with parallel data paths whereas fibre channel operates with serial data paths. Alternatively, an interface may interconnect a PCI bus with either a SCSI bus or Ethernet channel.

U.S. Pat. No. 5,185,736 (1993) of Tyrrell et al. discloses one interface in which a synchronous optical transmission system interconnects SONET formatted channels to lower speed channels in different formats. The transmission system incorporates fibre channel transmission, terminal multiplexers and related circuitry including frame synchronization circuitry and the like.

U.S. Pat. No. 5,260,933 (1993) to Rouse discloses a system and method for controlling the transmission of frames or data packets in a serial network to allow an "out-of-order" delivery, as is common in fibre optic networks. In such a network, an initiator node transmits data frames for delivery to a recipient node that includes a frame serial number or sequence count information. The recipient node transmits acknowledgement frames to indicate delivery of a data frame or packet including a matching serial number or sequence count information. In one embodiment the initiator node and recipient node include resources that relate the serial number or sequence count information, resources that include control information in an acknowledgement frame and resources that determine the transmit status of all acknowledgement frames prior to that specified by the serial or sequence count acknowledgement frame. The status information is used at the initiator node to update the status of any data frames whose acknowledgement has not been received as a consequence of an out of order delivery to the recipient, a delay in processing by the recipient, a delay of acknowledgement frame in the transmission back of the initiator mode, or a complete loss of the acknowledgement frame.

The foregoing references highlight a number of issues that any interface circuit must consider. These include diverse data transfer rates and the potential for out-of-order delivery with respect to particular data frames. Moreover, an interface should operate in accordance with diverse protocols without reducing effective transfer rates of information to and from the network.

Prior art interfaces that address these issues typically include controllers with a large number of such discrete components. Consequently these devices tend to consume significant power with a concomitant heat production and, by the increase in the number of connections and individual components, and with an increased risk of failure. Moreover these controllers generally include discrete processors with attendant programs for enabling the necessary flexibility required to operate such interfaces successfully.

Recently introduced application specific integrated circuit technology enables certain digital electronic functions to be incorporated in a single integrated circuit. Typically these circuits are formed with CMOS technology and provide particular advantages of operating at very low power and with a high reliability. Several companies have offered interfaces that incorporate the ASIC technology to combine certain components from prior interface circuits into single integrated circuit components. To implement an application in this technology, however, it must be possible to define the application in terms of register transfers and functions defined by simple gating logic. Recent prior art interfaces have grouped some functions on ASIC components, but these interfaces still comprise at least one ASIC component and other discrete components. They also generally incorporate a programmable micro processor that controls internal interface operations to provide the needed flexibility for implementing the necessary interface functions.

SUMMARY

Therefore, it is an object of this invention to provide an architecture for an interfacing circuit that eliminates any need for a processor to control internal interface operations.

Another object of this invention is to provide an architecture for an interface for interconnecting diverse data buses that can be implemented in a single application specific integrated circuit.

Still another object of this invention is to provide an application specific integrated circuit that is capable of interconnecting a fibre channel to a standard data processing system bus.

Yet another object of this invention is to provide an application specific integrated circuit interface that can be applied with flexibility to diverse data processing systems and high speed data channels.

In accordance with this invention, an application specific integrated circuit includes a first connection circuit for connection to a high-speed data channel, a second connection circuit for connection to the input/output bus of a data processing system, and a third connection circuit for connection to a buffer memory system. A frame processing circuit receives information from and transmits information to the high-speed data channel through the first connection circuit and divides and combines header and data portions of that information. A sequence managing circuit interposed between the frame processor circuit and the second and third connection circuits manages the transfer of information within the integrated circuit. A first transfer control circuit in the sequence managing circuit controls transfers between the frame processor and the buffer memory through the third connection circuit. A second transfer control circuit in the sequence managing circuit controls the transfer of information between the data system input/output bus and the buffer memory through the second and third connection circuits, respectively.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 15 is a table depicting the operation of a local memory manager shown in FIG. 5.

DESCRIPTION OF ILLUSTRATIVE EMBODIMENTS

Figure 1:
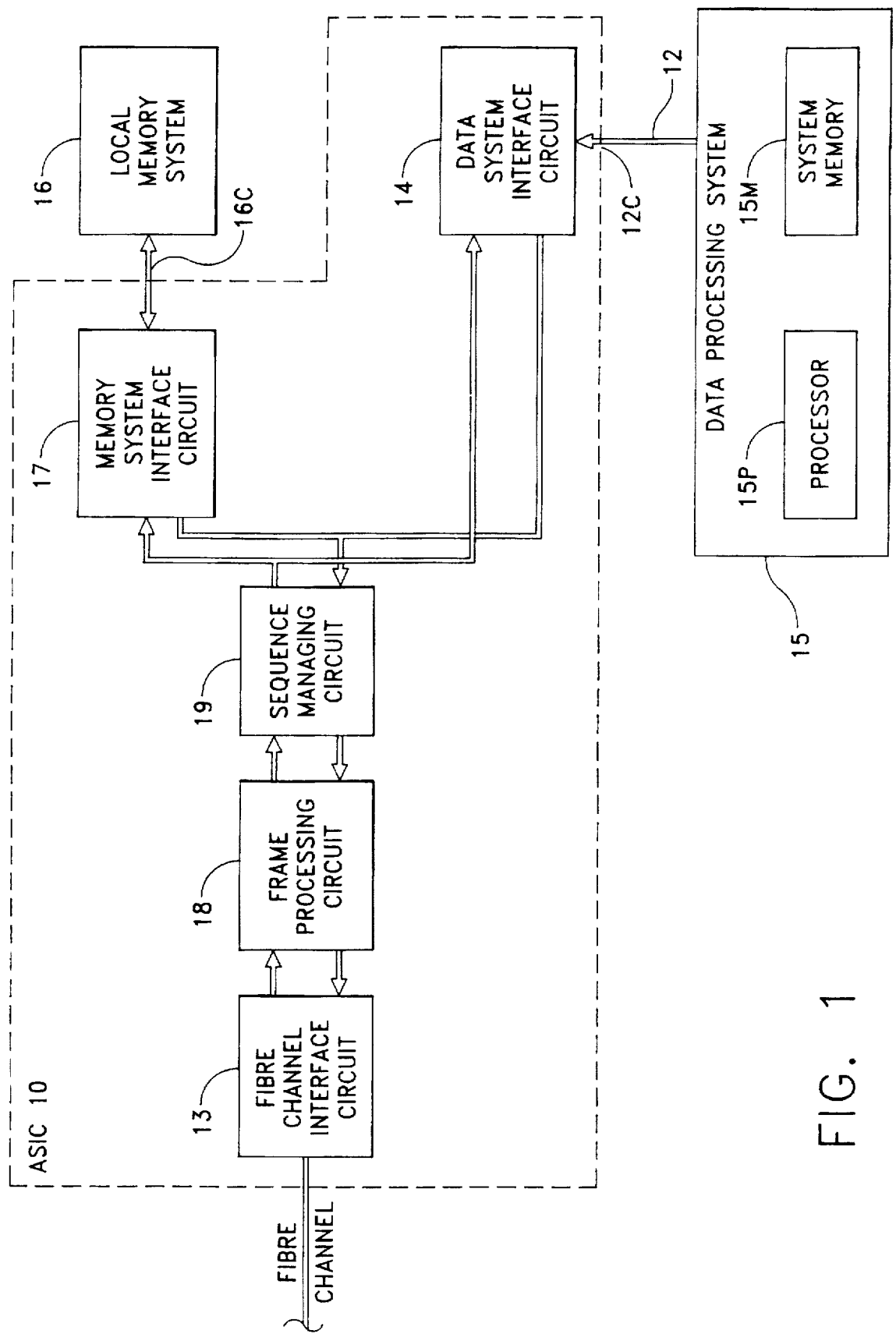
FIG. 1 is a basic block diagram of an application specific integrated circuit interface constructed in accordance with this invention.

FIG. 1 depicts an application specific integrated circuit (ASIC) 10 with its connections to a fibre channel 11, as an example of a high-speed data channel, and a data system input/output bus 12. The fibre channel 11 represents the digital signals received or transmitted in serial form prior to or after being converted to or from light energy form in an optical fibre channel or electrical form in a conventional electrical conductor fibre channel implementation. A fibre channel interface circuit 13 provides a first connection between the ASIC interface 10 and the fibre channel 11. A data system interface circuit 14 provides a data path through the data system bus 12 and connection 12C to a data system 15 including in this embodiment a processor 15P and a system memory 15M. The ASIC 10 additionally operates with a buffer, or local memory system 16, that typically will be external to the ASIC 10. This placement of the local memory system 16 enables the customization of the memory size. A memory system interface circuit 17 in the ASIC 10 provides a second connection 16C for the memory system 16. A frame processing circuit 18 and a sequence management circuit 19 onboard the ASIC 10 process and route data and coordinate the transfer of data between the fibre channel 11 and the memory system 16 and between the memory system 15M.

As known, information on a fibre channel and similar communications paths include information frames. Each frame comprises a header and data. The frame processing circuitry 18 reorganizes this data. For incoming information, the frame processing circuit 18 converts and reorganizes frames received from the fibre channel interface circuit 13 for being transferred in the appropriate order to the memory system 16. Conversely, during a transmission, the frame processing circuit 18 and sequence management circuit 19 process and reform data in the memory system 16 for transfer in an appropriate form onto the fibre channel 11. The sequence management circuit 19 performs similar functions with respect to data transfers between the data system memory 15M and the memory system 16.

Figure 2:
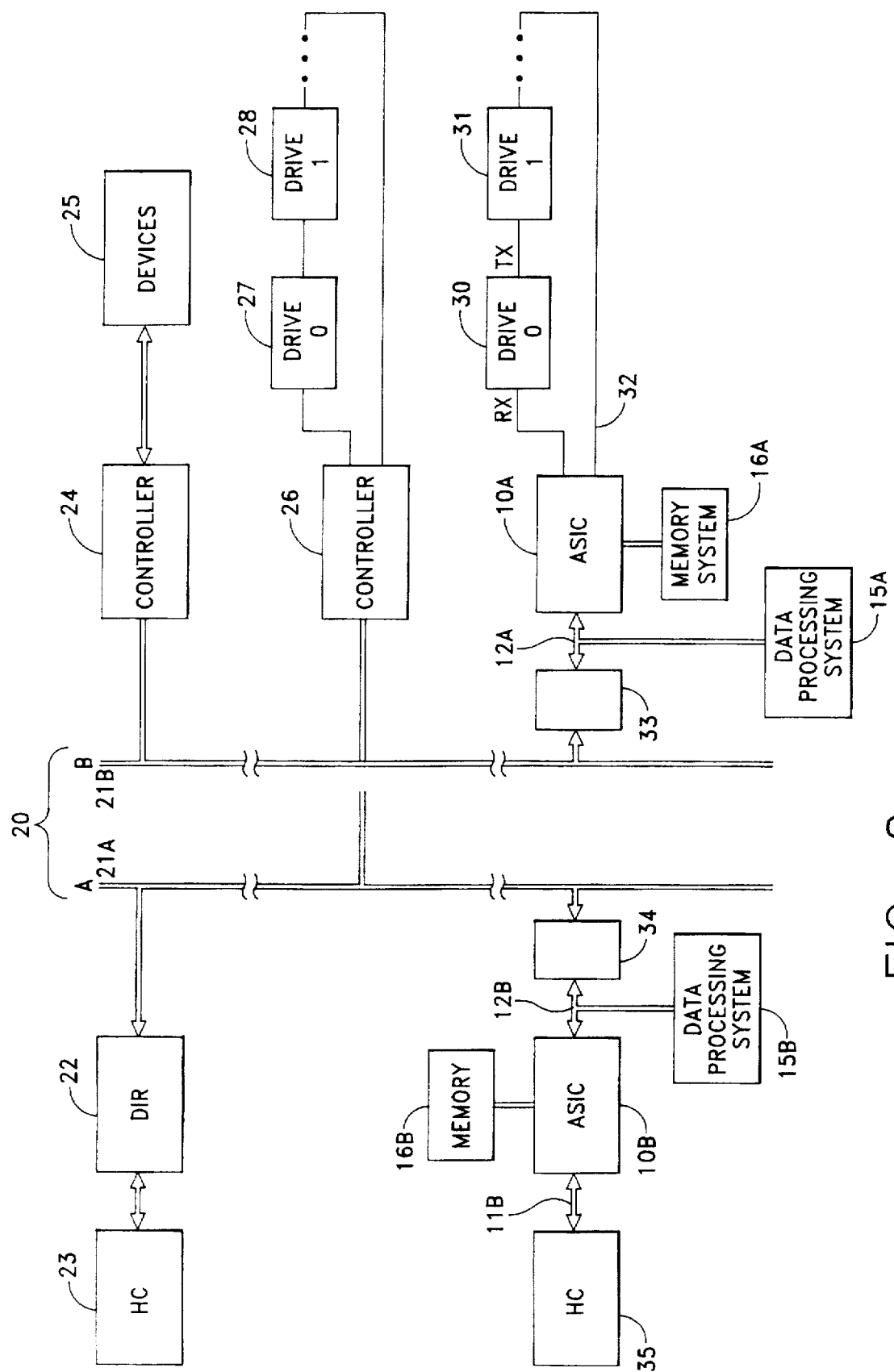
FIG. 2 depicts a network incorporating prior art interfaces and interfaces constructed in accordance with this invention.

FIG. 2 is a block diagram of a system that incorporates both prior art nodes and nodes utilizing the ASIC interface of this invention. The network is based on a SYMM bus 20 supplied with products of EMC Corporation, the assignee of this invention. The SYMM bus 20 is a dual bus with A and B buses designated by reference numerals 21A and 21B. According to conventional practice and as an example of a typical connection to the bus 21A, a data receiver 22 conducts signals from the bus 21A to a hardware controller 23 that would attach to other devices. As another example, a controller 24 interconnects the bus 21B and a series of devices 25 for bi-directional communications. Similarly a controller 26 connects the bus 21A to a daisy-chained disk drive, drives 27 and 28 being shown by way of example.

FIG. 2 also depicts two ASIC interfaces 10A and 10B constructed in accordance with this invention. ASIC interface 10A connects the bus 21B to drives 30 and 31 daisy-chained by a high-speed data path 32 such as a fibre channel. The daisy-chain drive connection shown in FIG. 2 is readily implemented because the fibre channel includes transmit (Tx) and receive (Rx) connections that are compatible with signals such as on the fibre channel 11. A simple SYMM bus/PCI bus interface 33 provides the necessary interface to the bus 21B. A memory system 16A connects to the ASIC 10A and corresponds to the memory system 16 shown in FIG. 1. A data processing system 15A connects to the ASIC 10A in parallel with the interface 33.

FIG. 2 also depicts the use of an ASIC interface 10B with a point-to-point connection to a hardware controller 35, such as an Ethernet controller. Again a simple interface 34 is interposed between a conventional PCI bus 12B and the bus 21A. The ASIC interface 10 also connects to the memory 16B and through the high speed channel 11B to the hardware controller 35.

As will become more apparent, the ASIC interfaces 10A and 10B can have the same structure. Consequently an ASIC interface constructed in accordance with this invention readily adapts to a variety of applications and provides great flexibility in its application.

SPECIFIC DESCRIPTION

Referring to FIG. 1, the ASIC interface 10 includes all the circuits constructed on a single integrated circuit substrate. This is possible because the function of each depicted circuit, as will become evident, can be implemented with registers and logic that are readily implemented in ASIC technology.

Figure 3:
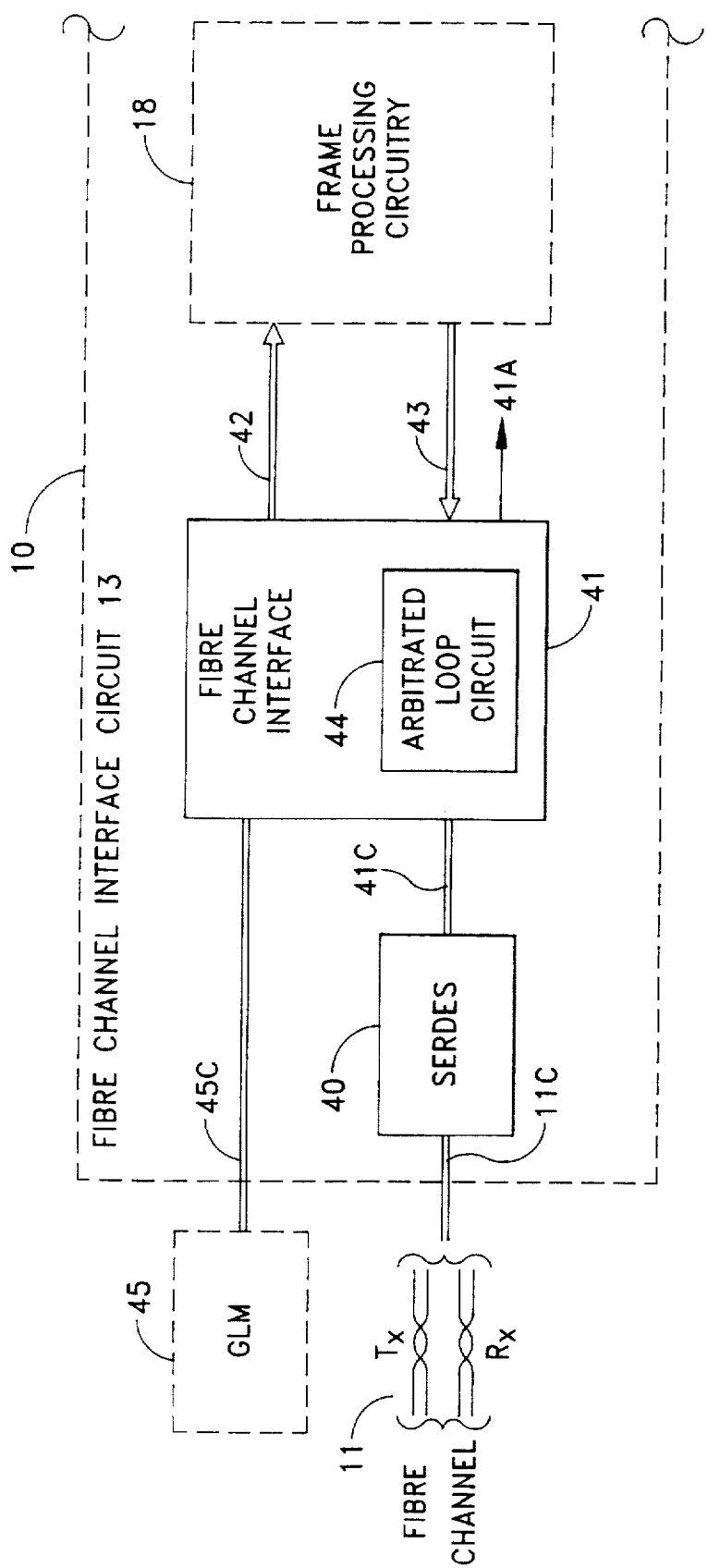
FIG. 3 depicts the fibre channel interface circuit shown in FIG. 1.

FIG. 3 discloses the fibre channel interface circuit 13 in more detail. The fibre channel 11, at the connection 11C, is formatted as Transmit (Tx) and Receive (Rx) serial data paths formed of twisted pair conductors that convey Tx and Rx signals in digital electronic format. A serializer/deserializer (SERDES) 40 forms an integral part of the fibre channel interface circuit 13 between the serialized data paths of the fibre channel 11 and the parallel data paths of the ASIC interface 10. A fibre channel interface 41 connects to the SERDES 40 through a connection 41C and to the frame processing circuit 18 by means of parallel data buses 42 and 43 that essentially transfer information to and from the frame processing circuit 18. The fibre channel interface 41 also includes an arbitrated loop circuit 44 that enables multiple fibre channels 11 to attach to the connection 11C. Such circuits are known in the art. A particularly suited serializer/deserializer 40 and interface 13 are described in the above-identified U.S. patent application Ser. No. 08/474, 235.

In this specific embodiment, the fibre channel interface circuit 13 includes an optional parallel connection 45C for connection to a Gigabaud Link Module (GLM) 45. As known in the art, a GLM module 45 typically connect to 10-, 20- 40-bit wide data paths and provides separate receive and transmit data paths to other circuits, such as the fibre channel interface 41. The GLM module 45 generates (1) a receive byte clock to indicate that the received data is valid, (2) a detect signal to indicate that a special character has been received and (3) a transmit byte clock to indicate when transmit data is valid. The connection 45C will typically comprise a 40-bit wide data path to provide a consistent interface to the remaining circuitry. U.S. Letters Patent application Ser. No. (EMC 95-005) discloses one particular user-suited embodiment of a GLM module.

Notwithstanding the particular implementation, the channel 45C provides a parallel data path for the receipt of data from a high-speed path, such as found in a SCSI bus. If demands for multiple connections are made to the connections 11C and 45C, the arbitrated loop circuit 44 can also determine which connection ought to be recognized.

The fibre channel interface 41 additionally includes circuitry for specified framing, decoding and synchronization protocols. A conductor 41A transfers control signals from the fibre channel interface 41 to the sequence management circuit 19, particularly an interrupt manager in that circuitry.

Figure 4:
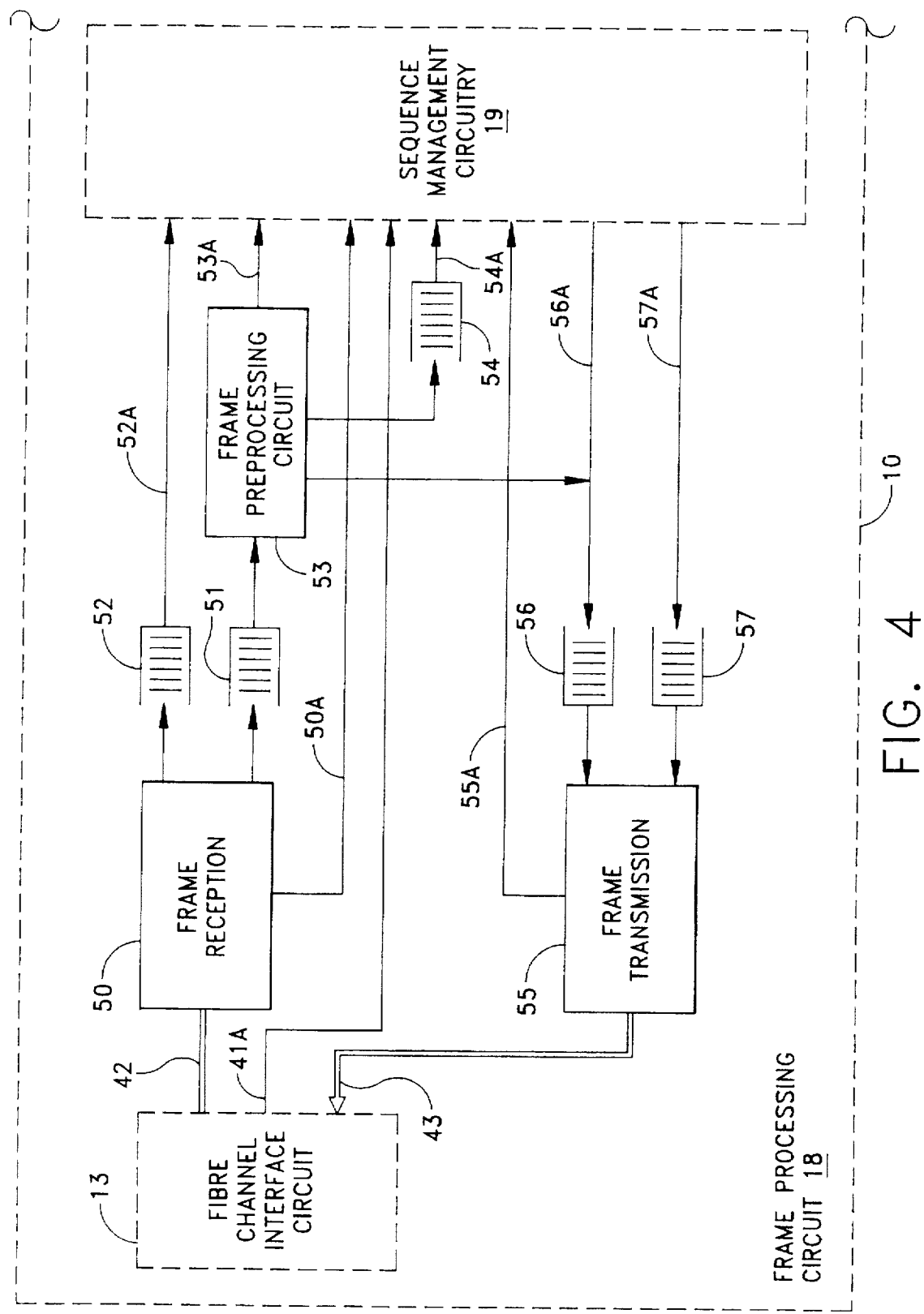
FIG. 4 is a more detailed block diagram of a frame processing circuit shown in FIG. 1.

FIG. 4 depicts the frame processing circuit 18 in the ASIC interface 10 in relation to the fibre channel interface circuit 13 and the sequence management circuit 19. The frame processing circuit 18 includes a frame reception circuit 50 that receives the incoming information frames and divides each frame into a header portion for transfer into a received header FIFO (first in, first out) buffer 51 and a data portion for transfer into a received data FIFO buffer 52. All these actions are defined by the data channel protocols. Other circuitry performs basic validity and CRC checking.

A frame preprocessing circuit 53 provides another layer of validity checking on received frame data including a destination ID check and class of service validation. The frame preprocessing circuit 53 also generates a BSY or RJT signals for transfer into a message FIFO buffer 54 or transfer to the frame transmission circuit 55 through a transmit header FIFO buffer, or link response FIFO, 56. Essentially the frame preprocessing circuit 53 filters data going to the sequence management circuitry 19 to prevent the sequence management circuit 19 from performing unproductive work.

The frame transmission circuit 55 receives signals from the link response FIFO 56 and from a transmit data FIFO buffer 57. The frame transmission circuit 55 breaks fibre channel frame data into type and code information that the fibre channel interface circuit 13 can process. The frame transmission circuit 55 also calculates and appends CRC information and enforces protocol framing rules. Other elements of the frame transmission circuit 55 arbitrate between regular frame data and fibre channel link response data that is received from the transmit data FIFO buffer 57 and link response FIFO 56. Specific operations of the frame processing circuit 18 corresponds to the operations described in United States patent application Ser. No. 08/363,392.

The sequence management circuit 19 also responds to interrupt signals from the frame reception circuit 50 on a data path 50A, from the frame preprocessing circuit 53 on a data path 53A, and from the frame transmission circuit 55 on a data path 55A. Other information is available from the message FIFO buffer 54 on a path 54A.

Figure 5:
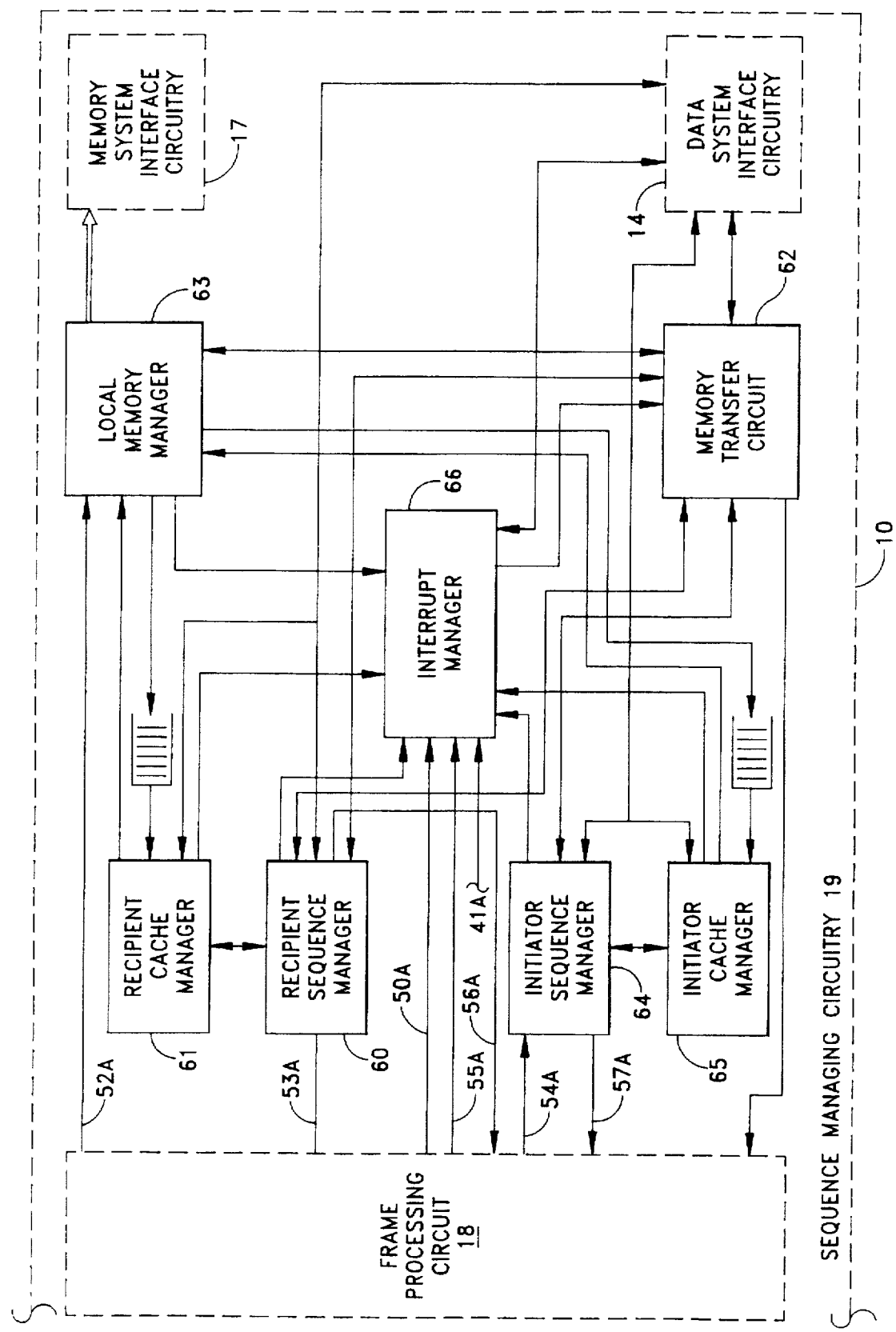
FIG. 5 is a more detailed block diagram of a sequence managing circuit shown in FIG. 1.

Referring to FIG. 5, the sequence management circuit 19 connects to the frame processing circuit 18, the data system interface circuit 14 and the memory system interface circuit 17. It includes a recipient sequence manager 60 and recipient cache manager 61 that operate with a memory transfer circuit 62 and a local memory manager 63 for reassembling out-of-order data frames and conveying data through the memory system interface circuit 17 to the memory buffer 16 shown in FIG. 1. An initiator sequence manager 64 and initiator cache manager 65 operate with the memory transfer circuit 62 and local memory manager 63 to convey information from the memory system 15 back through the frame processing circuit 18 onto the data channel 11.

Referring first to the reassembly of data frames, when the ASIC interface 10 interconnects to a fibre channel fabric, it is possible that successive data frames received from another source will arrive out of order because they travel over different paths. The recipient sequence manager 60 interprets the frame, processes data descriptors provided by the data processing system 15 in FIG. 1 and controls the operations of the memory transfer circuit 62 so that data moves from the local memory 16 into system memory 15M in the appropriate order and performs certain error recovery procedures where necessary. In addition the recipient sequence manager 60 includes other circuits for validating data and controlling the transfer as described hereinafter. The recipient sequence manager 60 additionally operates in conjunction with the recipient cache manager 61 to accomplish the context switching. As the managers 60 and 61 are hardware implemented, latency required by prior art context switching is reduced significantly.

In a similar fashion, the initiator sequence manager 64 is responsible for segmenting information data, identified by system provided data descriptors, into fibre channel frames.

The initiator sequence manager 64 additionally programs the memory transfer circuit 62 and transfers header data into the link response FIFO 56 shown in FIG. 4 that, in this case, acts as a transmit header FIFO buffer. The initiator sequence manager 64 additionally includes other circuits for providing data validation and for controlling transfers onto the fibre channel 11. The initiator sequence manager 64 works with the initiator cache manager 65 to accomplish hardware managed context switches without any significant latency normally encountered in prior art processor control context switching.

In one particular embodiment the memory transfer circuit 62 comprises a direct memory access circuit and coordinates data transfers to and from the local memory system 16 through the local memory manager 63 and memory system interface circuit 17 and to and from the system memory 15M through the data system interface circuit 14. As these transfers occur other circuits in the memory transfer circuit 62 perform LRC calculations and error handling functions.

The local memory manager 63 contains arbitration logic to provide priority to received framed data on data path 52A and a memory controller. In a preferred embodiment, the local memory system 16 comprises a RDRAM memory because the ASIC interface 10 can achieve over 400 hundred megabyte/per second performance with a single memory chip and can be constructed with up to 4 Gigabyte capacity.

The operation of the ASIC interface 10 shown in FIGS. 1 and 3 through 5 corresponds to that described in foregoing United States patent application Ser. No. 08/363,392. In effect, these operations and others can all be implemented as a hardware-implemented state driven machine that is interrupt responsive and with ASIC technology. This is further enhanced by incorporating on the integrated circuit substrate an interrupt manager 66. The interrupt manager 66 receives interrupt signals from all the other elements on the ASIC interface 10 and controls the transfers of control information and data through the interface 10. The interrupt manager 66 also transfers interrupt information to and receives information from the data processing system 15 connected to the data system interface circuit 14.

With this as background it is now possible to describe the ASIC interface 10 in detail, particularly those functions that enable the interface 10 to be constructed as a single integrated circuit. This description includes a detailed listing of the hardware components and the operations of the interrupt manager 66 and of the recipient sequence manager 60 and recipient cache manager 61 in terms of sequence and of internal transfers that will enable a person of ordinary skill in the art to determine a specific integrated circuit implementation of the interface 10. Consequently, the remaining elements of the ASIC interface 10 will only be described functionally, as the underlying philosophy for implementing these elements is the same as for the interrupt manager 66 and the recipient sequence and cache managers 60 and 61.

Figure 6:
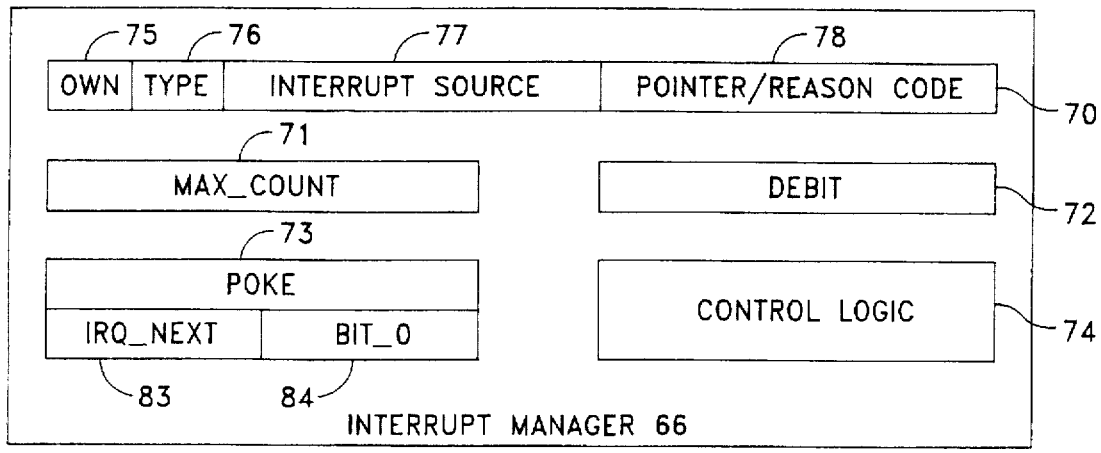
FIG. 6 is a block diagram of portions of an interrupt manager shown in FIG. 5.

Referring to FIG. 6, the interrupt manager 66 includes an IRQ descriptor register 70, a MAX_COUNT register 71, a DEBIT register 72, a POKE register 73 and control logic 74. The IRQ descriptor register 70 may contain four fields, namely a one-bit OWN field 75, a one-bit TYPE field 76, an eighteen-bit INTERRUPT SOURCE field 77 and a forty-four-bit POINTER/REASON CODE field 78. The contents of this register constitute a message that is sent to the data processing system 15 in response to or simultaneously with an Interrupt Request (IRQ) from the interrupt manager 66. The OWN field 75 indicates whether an IRQ has been generated by the ASIC interface 10. The TYPE bit 76 when cleared, indicates that the INTERRUPT is of a type that requires response by the data processing system 15. The INTERRUPT SOURCE field 77 identifies which of the blocks in FIGS. 3 through 5 have generated the INTERRUPT REQUEST. As will become apparent later, each INTERRUPT generated by the ASIC interface 10 includes an IRQ REASON code. If the TYPE field 76 is cleared, the POINTER/REASON CODE field 70 incorporates such an IRQ REASON code. Otherwise the POINTER/REASON CODE field 70 contains a pointer to a Sequence Control Block (SCB).

Figure 7:
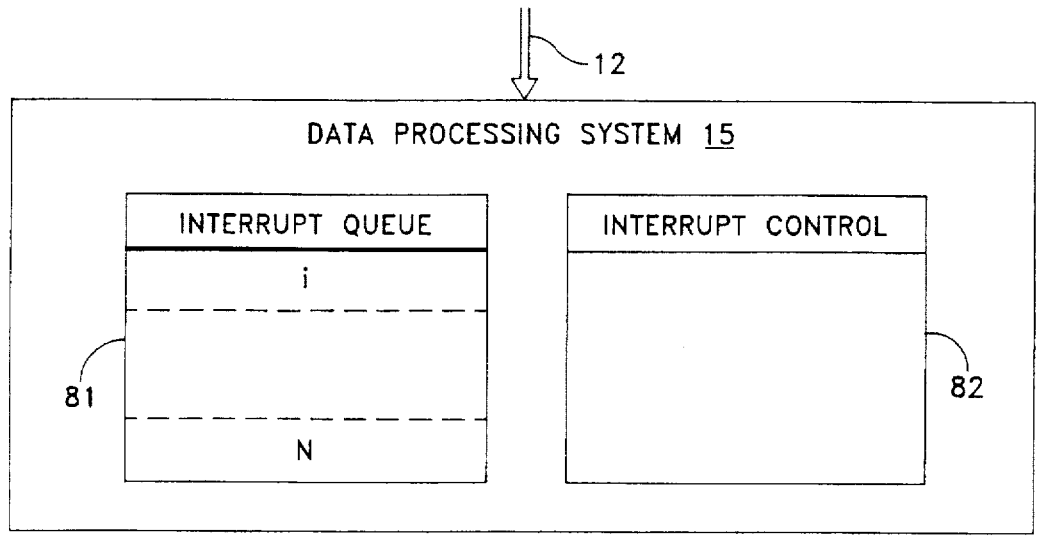
FIG. 7 is a block diagram of an interrupt responsive portion of a data processing system for connection to the application specific integrated circuit interface shown in FIG. 1.

FIG. 7 depicts an Interrupt Queue 81 and interrupt logic 82 in the data processing system 15 The Interrupt Queue receives the contents of the IRQ descriptor from the register 70 in FIG. 6 and includes "N" locations for storing "N" IRQ descriptors. N then represents the maximum number of interrupts that can be stored in the data processing system 15. The data processing system 15 transfers that maximum number "N" to the MAX_COUNT register 71, that is an addressable register within the ASIC interface 10, during initialization. During initialization, the data processing system 15 also sets the DEBIT register 72 to zero, sets an IRQ_NEXT bit 83 and clears a BIT_0 position 84.

Figure 8:
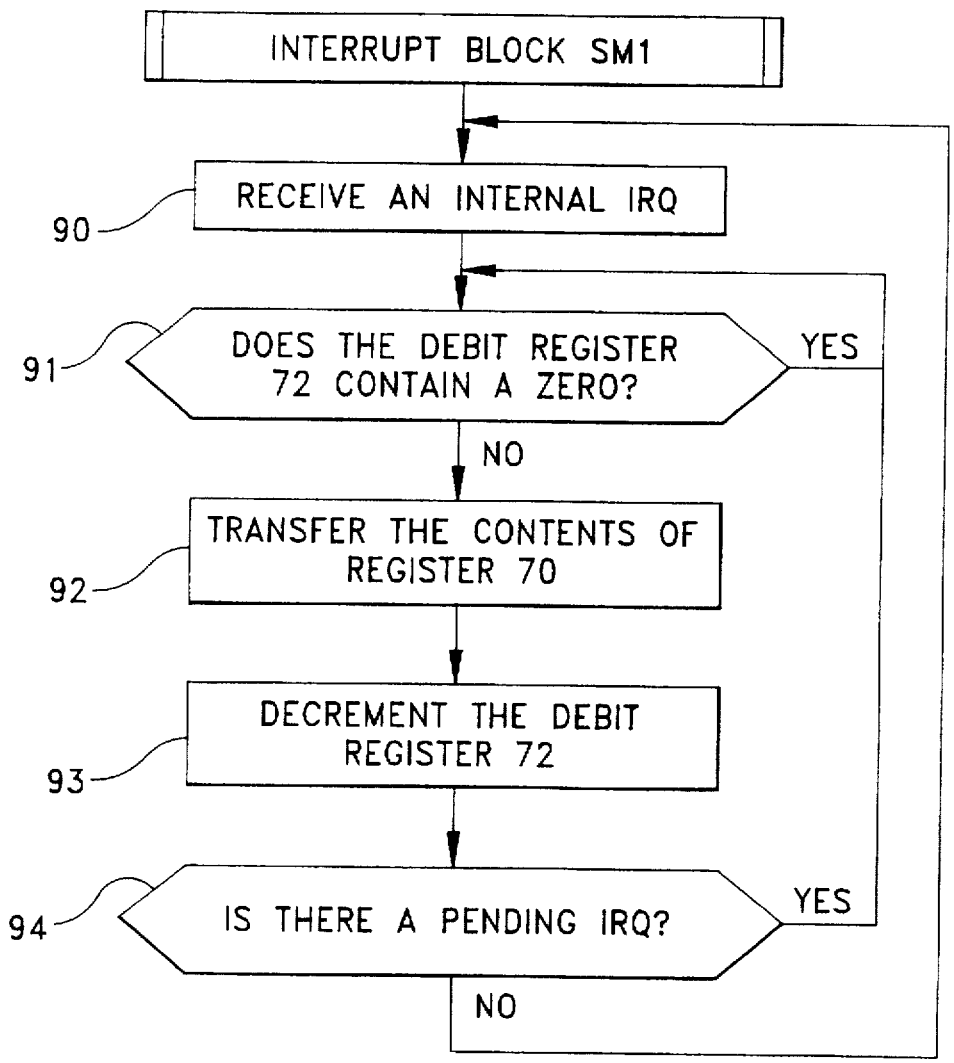
FIG. 8 is a flow diagram depicting one sequence of operations performed by the interrupt manager shown in FIG. 6.

The interrupt manager 66, particularly the control logic 74 in FIG. 6, runs two program modules. FIG. 8 depicts the one module, designated Interrupt Block SM1, by which the control logic 74 in FIG. 6 transfers an interrupt request to the Interrupt Queue 81 in FIG. 7. Specifically in FIG. 8, the control logic 74 receives an internal IRQ in step 90 from one of the circuits in the ASIC interface 10. In step 91 the control logic 74 determines whether the DEBIT register 72 in FIG. 6 contains a zero. At any given time the DEBIT register 72 contains the value stored in the MAX_COUNT register 71 at initialization minus a number corresponding to the outstanding IRQ's that have been sent to the data processing system 15. When the DEBIT register 71 equals zero, no additional transfers can be made, so the control logic 74 waits at step 91 until room exists in the Interrupt Queue 81 of FIG. 7.

When the DEBIT register 72 in FIG. 6 shifts to a non-zero value, step 91 in FIG. 8 diverts to step 92 whereupon the control logic 74 causes the contents of the IRQ descriptor register 70 to transfer into the Interrupt Queue 81 of FIG. 7. The control logic 74 then decrements the DEBIT register in step 93. Step 94 represents the process by which the control logic 74 then determines whether to exit any further control or whether there is another pending internal interrupt request. In the latter case, control returns from step 94 to step 91 to transfer the next IRQ descriptor into the Interrupt Queue.

Figure 9:
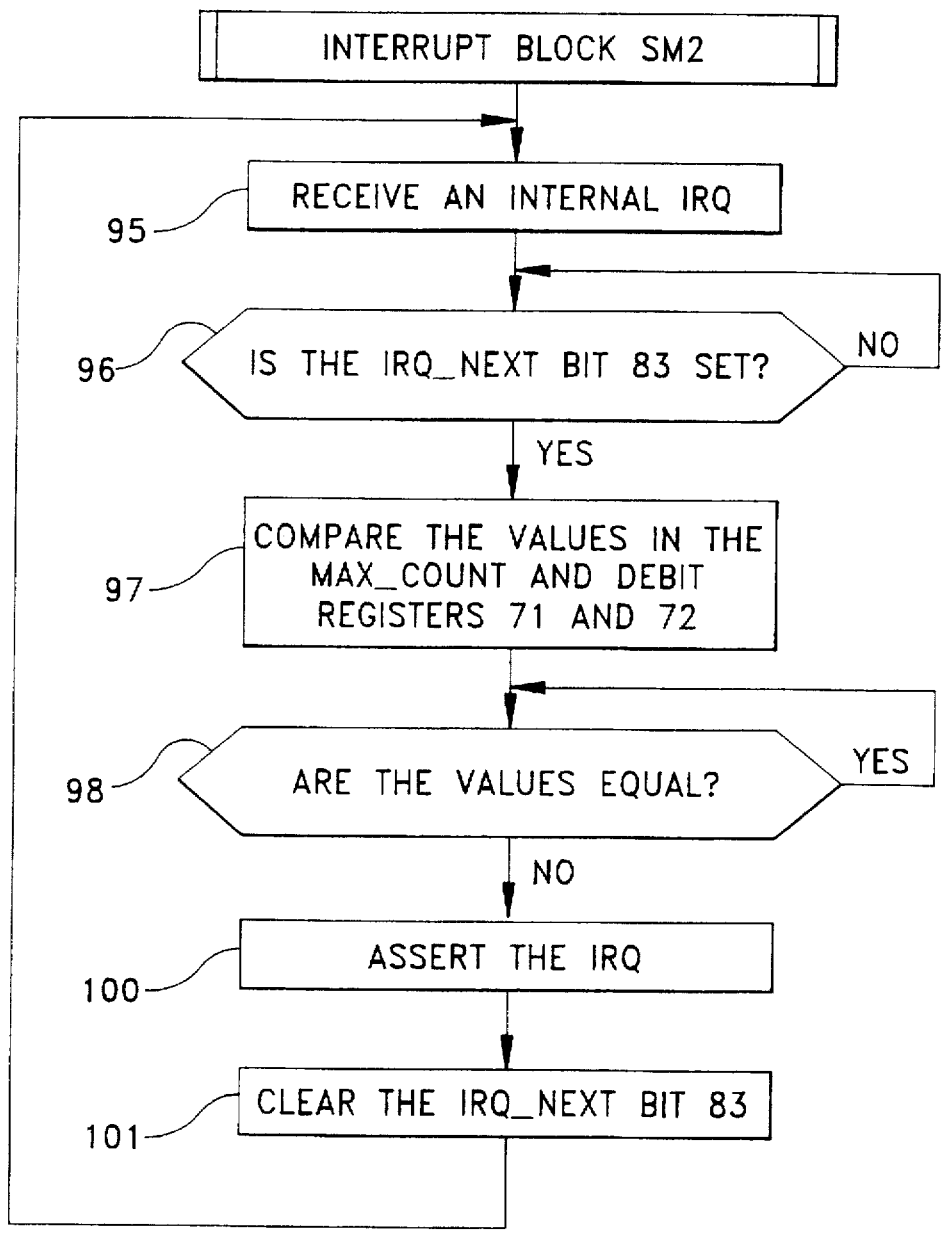
FIG. 9 is a flow diagram depicting another set of operations performed by the interrupt manager shown in FIG. 6.

FIG. 9 represents the process under which the control logic 74 determines whether to implement the process of FIG. 8. Referring to FIGS. 6 and 9, when the control logic 74 receives an internal interrupt request in step 95, it examines the IRQ_NEXT bit 83 in a POKE register 73 during step 96. If the IRQ_NEXT bit 83 is cleared, indicating that an interrupt request has been sent to the data processing system 15 in FIG. 7, the control logic 74 effectively enters into a wait state. Otherwise step 96 diverts to step 97 whereupon the control logic 74 compares the values of the MAX_COUNT register 71 and DEBIT register 72. If those values are equal, then there are no outstanding requests; and the control logic 74 waits at step 98. When an outstanding request does exist, step 98 diverts to step 100 and the control logic 74 produces an interrupt signal for transfer to the data processing system 15 indicating that the Interrupt Queue 81 contains information. In step 101 the control logic 74 clears the IRQ_NEXT bit 83 to indicate that it is passing control of the interrupt queue 81 to the data processing system 15.

Figure 10:
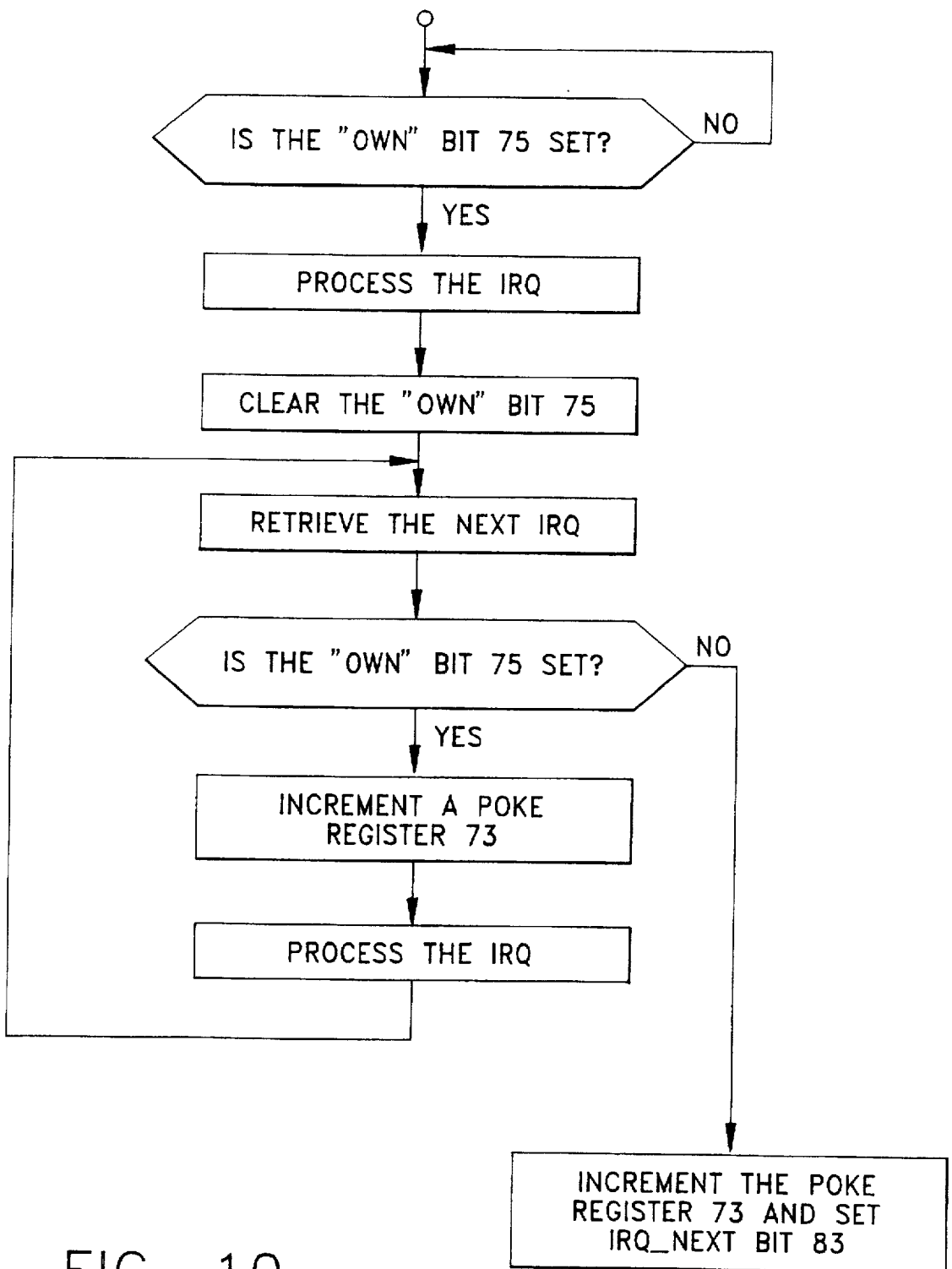
FIG. 10 is a flow diagram depicting an operation of the interrupted portion of the data processing system shown in FIG. 7.

When the data processing system 15 in FIG. 7 receives the interrupt request from the interrupt manager 66, the interrupt control 82 initiates the process shown in FIG. 10. Referring to both figures, the interrupt control 82 first waits in step 102 until it receives an IRQ descriptor from the Interrupt Queue 81 with the OWN bit set indicating that this is an interrupt from the ASIC interface 10. When that occurs, step 103 processes the interrupt request and clears the OWN bit in step 104 for internal purposes. Next the interrupt control 82 having started, attempts to retrieve a next request in step 105. If the OWN bit is not set, step 106 diverts to step 107 whereupon the interrupt control 82 transfers data to the POKE register 73 in the interrupt manager 66, which is an addressable register, to set the IRQ_NEXT bit 83 and transfer control back to the system. Otherwise the interrupt control 82 increments the POKE register 73, particularly the BIT_0 position 84. The control logic 74 responds by incrementing the DEBIT register 72. Still referring to FIG. 10, after incrementing the POKE register 73, the interrupt control 82 processes the IRQ in step 104 and then transfers control back to step 105 to retrieve the next IRQ request. When all the IRQ requests have been transferred, the system will receive a null value for the OWN bit position and transfer control to step 107.

The structure of the interrupt manager 66 shown in FIG. 6 and the necessary control logic for implementing the processes of FIGS. 8 and 9 are readily adapted for implementation on the ASIC interface 10. The described organization facilitates the transfer of necessary interrupt information to the data processing system for appropriate responses. Each IRQ descriptor includes a REASON CODE. This code is readily generated from standard preprogrammed memory tables formed on the ASIC interface 10. As will also become apparent, the interrupt manager 66 also operates in conjunction with other portions of the ASIC interface 10 to eliminate unnecessary context switching and enables all context switching to occur on the ASIC interface.

One of the interrelated structures that operate in conjunction with the interrupt manager is the frame preprocessing circuit 53 shown in FIG. 4. Like the interrupt manager 66 in FIG. 5, the frame preprocessing circuit 53 comprises different registers and tables, normally preprogrammed during construction of the ASIC interface 10, and a logical control unit that operates as a hardware state machine for controlling operations within the frame preprocessing circuit 53. More specifically, the frame preprocessing circuitry 53 shown in FIG. 11 includes a preprocessor control 110 that establishes the various paths and sequences by which data transfers into and out of other registers and tables within the frame preprocessing circuit 53. The preprocessor control 110 also produces a signal for transfer to the interrupt manager 66 over the conductor 53A and establishes a path through the frame preprocessing output FIFO 54 for transferring further information into the sequence management circuitry for appropriate response by the interrupt manager 66 in FIG. 5.

Figure 11:
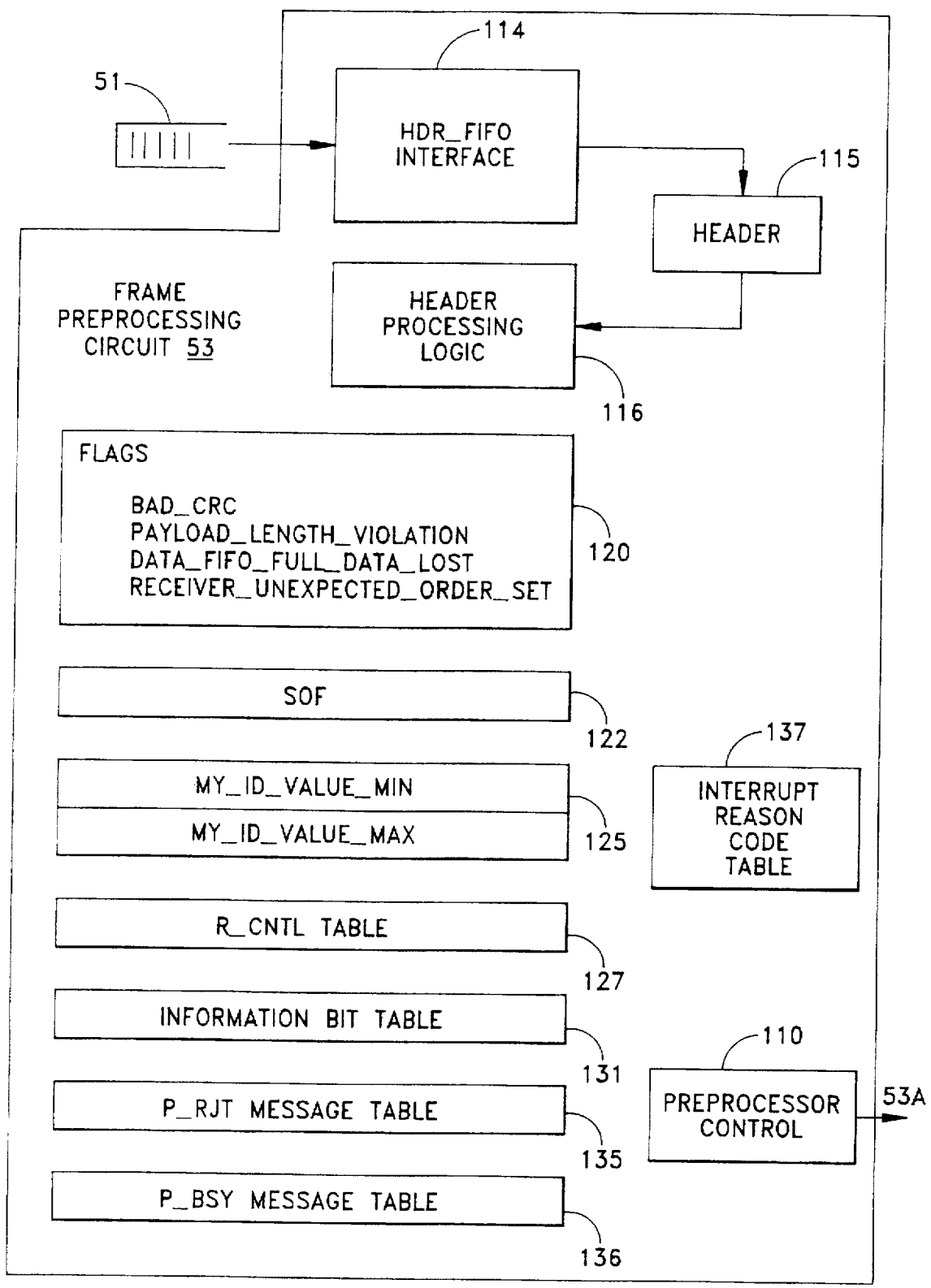
FIG. 11 depicts certain features of a frame preprocessing circuit shown in FIG. 4.
Figure 12:
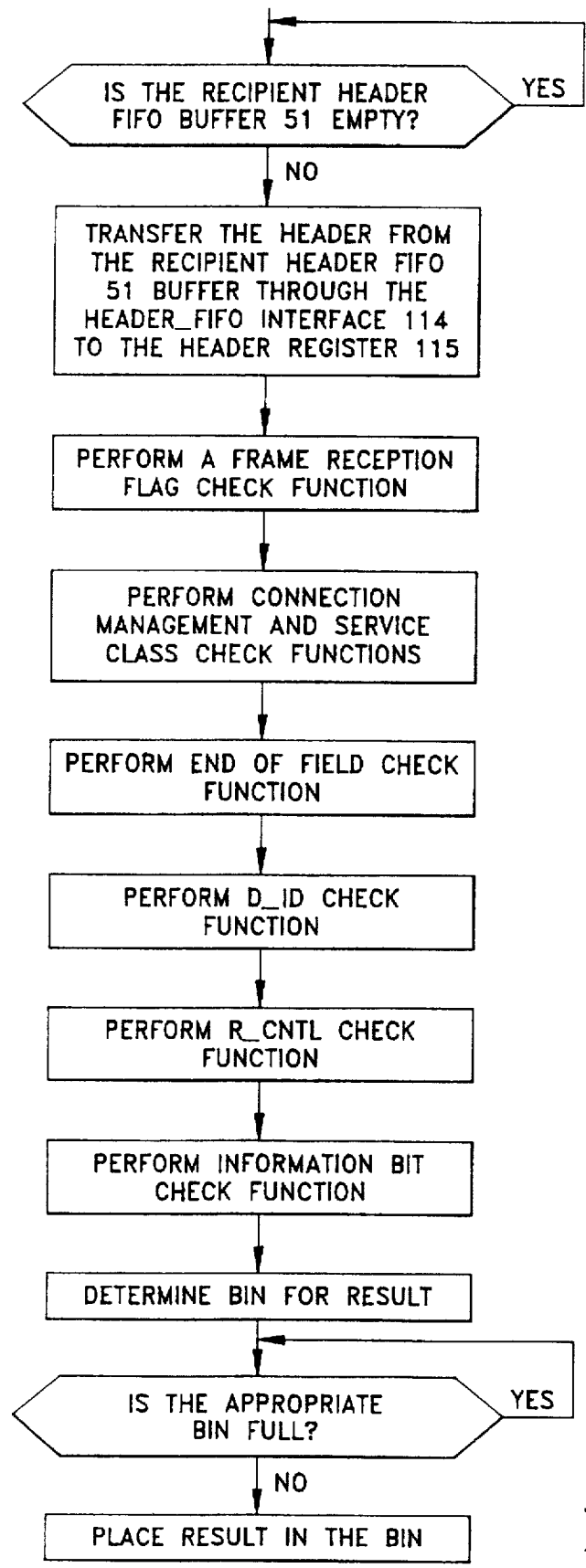
FIG. 12 and related

The preprocessor control 110 in FIG. 11 initially operates to determine if the header receive FIFO 51 is empty in step 112 shown in FIG. 12. When information appears in the receive header FIFO 51, the preprocessor control 110 uses step 113 to transfer that information through a header FIFO interface 114 to a header register 115. Header processing logic 116 examines the information in the header register 115 by performing various tests. In this particular system, and still referring to FIGS. 11 and 12, in step 117 the preprocessor control 110 and header processing logic 116 perform various flag checks for a series of flags 120. Step 121 represents class of service tests using information in an SOF field 122. In step 124 the preprocessor control 110 checks the destination identification for the incoming header against a range of destinations established in an identification table 125. The preprocessor control 110 then uses step 126 to assure that the type of frame being received corresponds to one in a routing control table 127. The preprocessor control 110 uses step 130 to determine whether to analyze the information bit field of each received frame by comparison against information received from an information bit table 131. If all these tests conclude successfully, the preprocessor control uses step 132 in an attempt to load a result into a bin. In step 133 the preprocessor control 110 determines whether the appropriate bin is full. When there is room in the bin, the preprocessor control 110 makes the transfer in step 134.

At the termination of any of the procedures identified in FIG. 12, the preprocessor control generates an interrupt request and transfers a message into the POINTER/REASON CODE field 78 shown in FIG. 10. This process includes forming a pointer that identifies a P_RJT register message table 135, a P_BUSY message table 136 and an interrupt REASON CODE table 137 to produce a message for the IRQ descriptors.

Figure 12A:
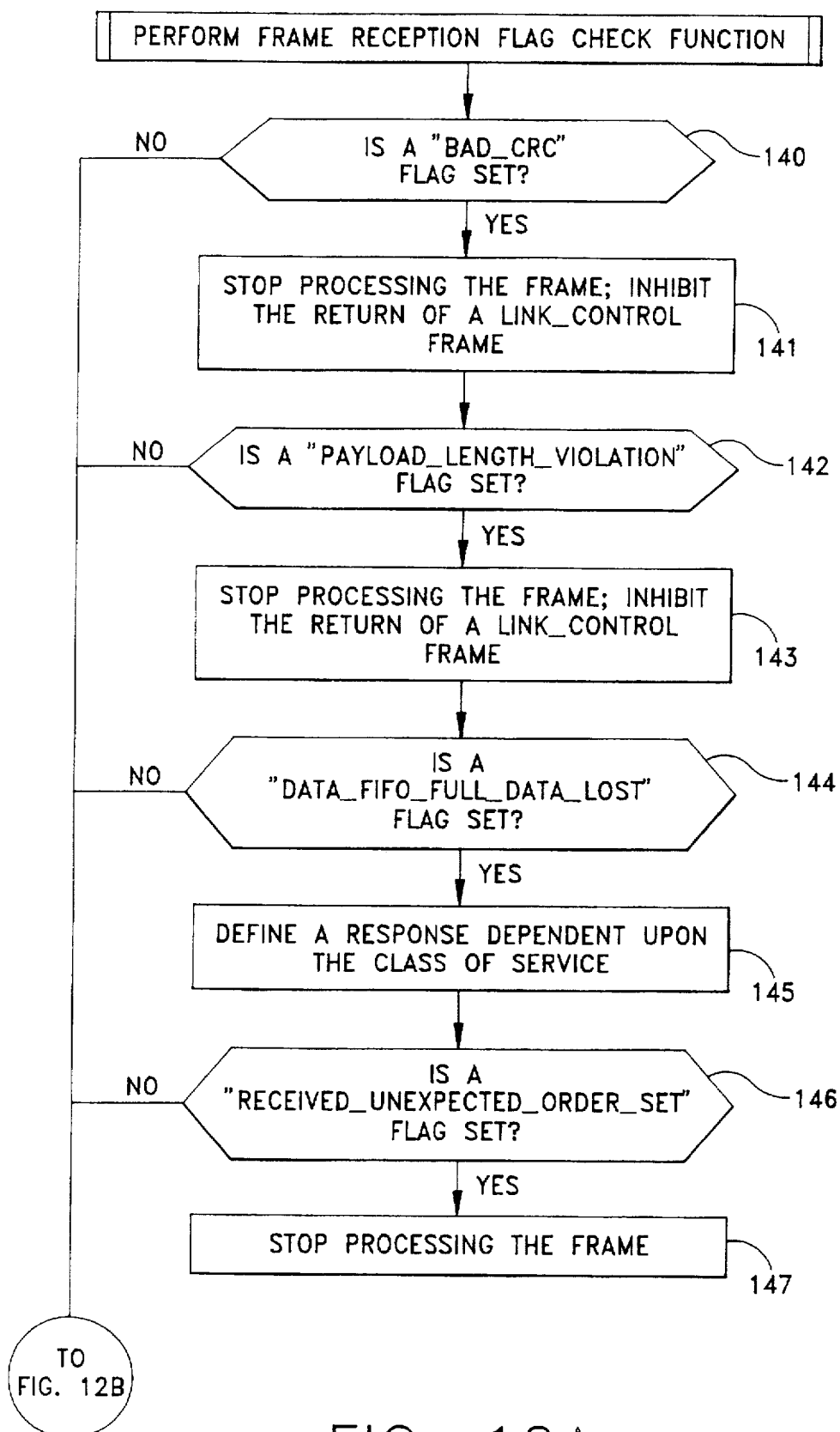
FIGS. 12A through 12I depict the operation of a preprocessor control shown in FIG. 11.

FIG. 12A depicts the steps required for performing a frame reception and flag check function. Referring to FIGS. 12A and 11, the processor control uses step 140 to test the BAD_CRC flag. If it is set, indicating a CRC error, the preprocessor control 110 uses step 141 to stop processing the frame and inhibit the return of a link control frame. It may also select an entry from the interrupt REASON CODE table 137 for transfer to the POINTER/REASON CODE field 78 of the IRQ descriptor 70 in FIG. 6. Similar functions are performed by steps 142 and 143 with respect to a Payload_Length_Violation flag and in steps 144 and 145 in response to the condition of a DATA_FIFO_FULL_DATA_LOST flag. If a RECEIVED_UNEXPECTED_ORDER_SET flag indicates an error condition, step 146 transfers to step 147 and frame processing terminates. If the flags and any other like conditions are satisfied, the preprocessor control 110 in FIG. 11 transfers control to step 150 in FIG. 12B where the system begins to perform connection management and class of operations functions control as identified by step 121 in FIG. 12.

Figure 12B:
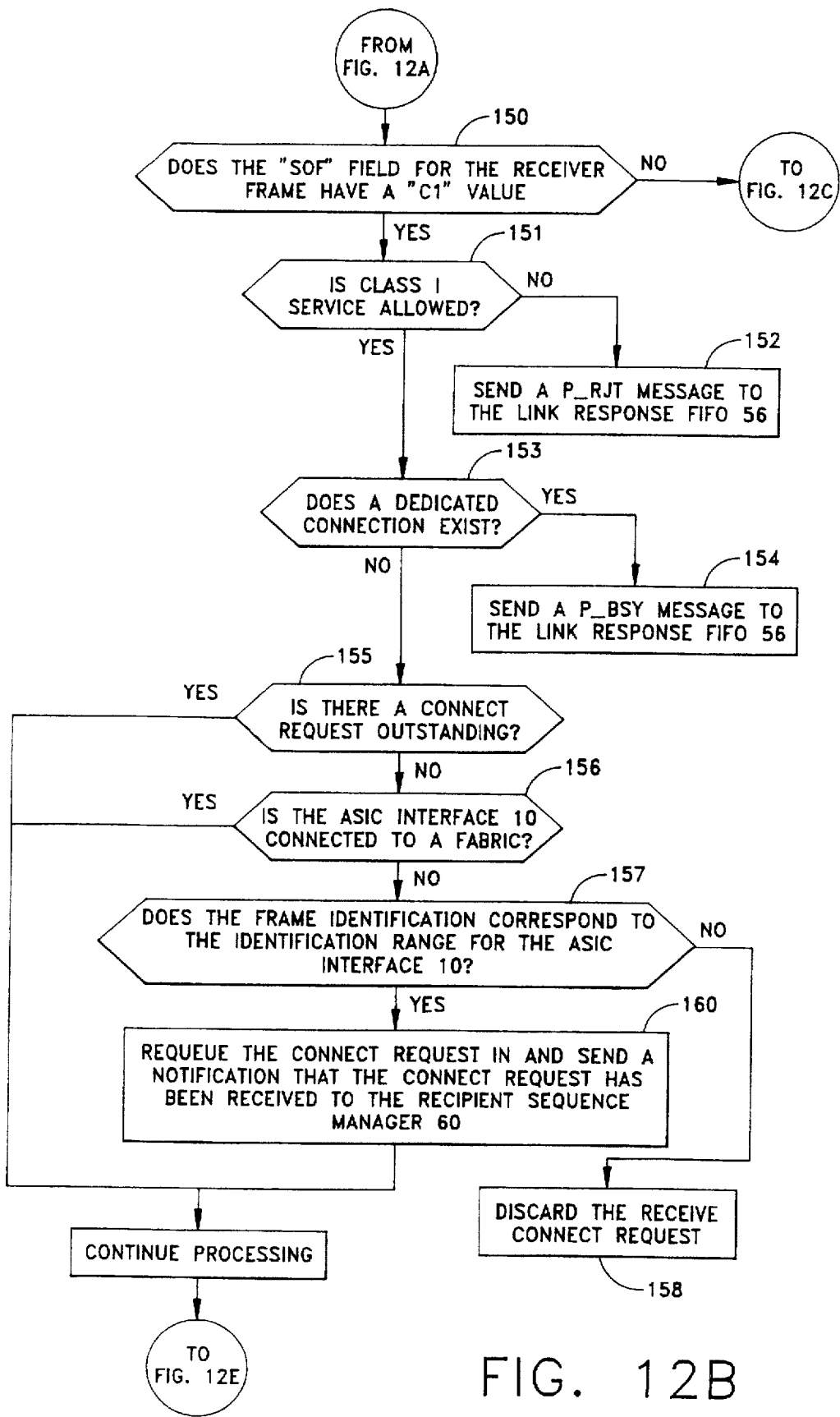

Referring to FIG. 12B, step 150 determines whether the SOF field has a "c1" value corresponding to a "Start of Frame— Connect Class 1" condition. If it does not, control transfers to FIG. 12C where the SOF field is tested for other values. If the SOF field has a "c1" value, the data frame is being transferred in a Class I mode. Step 151 in FIG. 12B determines whether the ASIC interface 10 is configured to respond according to a Class I service protocol. If it is not, then the preprocessor control 110 produces a P_RJT message in step 152 that indicates Class I service is not allowed and transfers this message to the link response FIFO 56 in FIG. 4. If Class I service is allowed, step 152 diverts to step 153 where the preprocessor control 110 determines whether a dedicated connection exists. If that condition is indicated, then the connection is busy and the system sends a P_BSY message to the transmit header FIFO buffer 56. If a connect request is outstanding, step 155 transfers to continue processing. Otherwise step 155 diverts to step 156 to determine if the ASIC interface 10 connects to a fabric. If it does, the system continues processing. Otherwise the preprocessor control 110 determines in step 157 whether the frame identification corresponds to the identification range for the particular ASIC interface 10. If it does not, the preprocessor control 110 discards the received connect request in step 158 and terminates further processing. If the request is within the range, processing continues after the processor requeues the connect request and sends a notification that connect request has been received to the recipient sequence manager in step 160. Step 160 then diverts to continue processing in FIG. 12D.

If the SOF field as tested in step 150 did not contain a "c1" value, step 150 diverts to step 161 where the preprocessor control determines if the SOF field has a "i1" or "n1" value corresponding to a designation of "Start of Frame—Normal Class I" or "Start of Frame—Initiate Class I". Similar tests as performed in FIG. 12 are then performed in FIG. 12C with tests for Class I service in step 162, for dedication in step 163, and for a corresponding identification in step 164. If errors exists, appropriate P_RJT messages are sent to the link response FIFO 56 in steps 165, 166 and 167 respectively. Otherwise control passes to FIG. 12E.

Figure 12C:
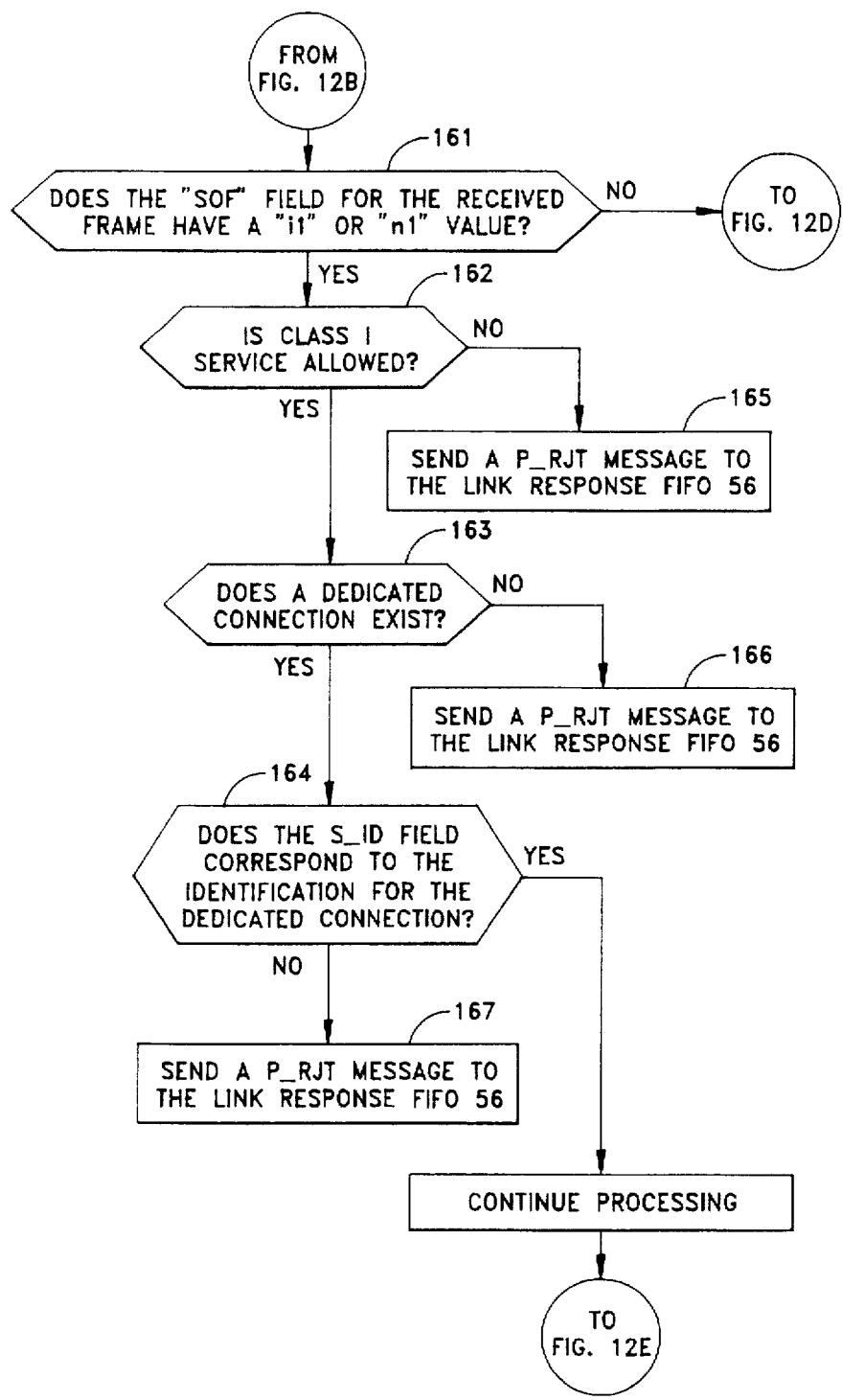
Figure 12D:
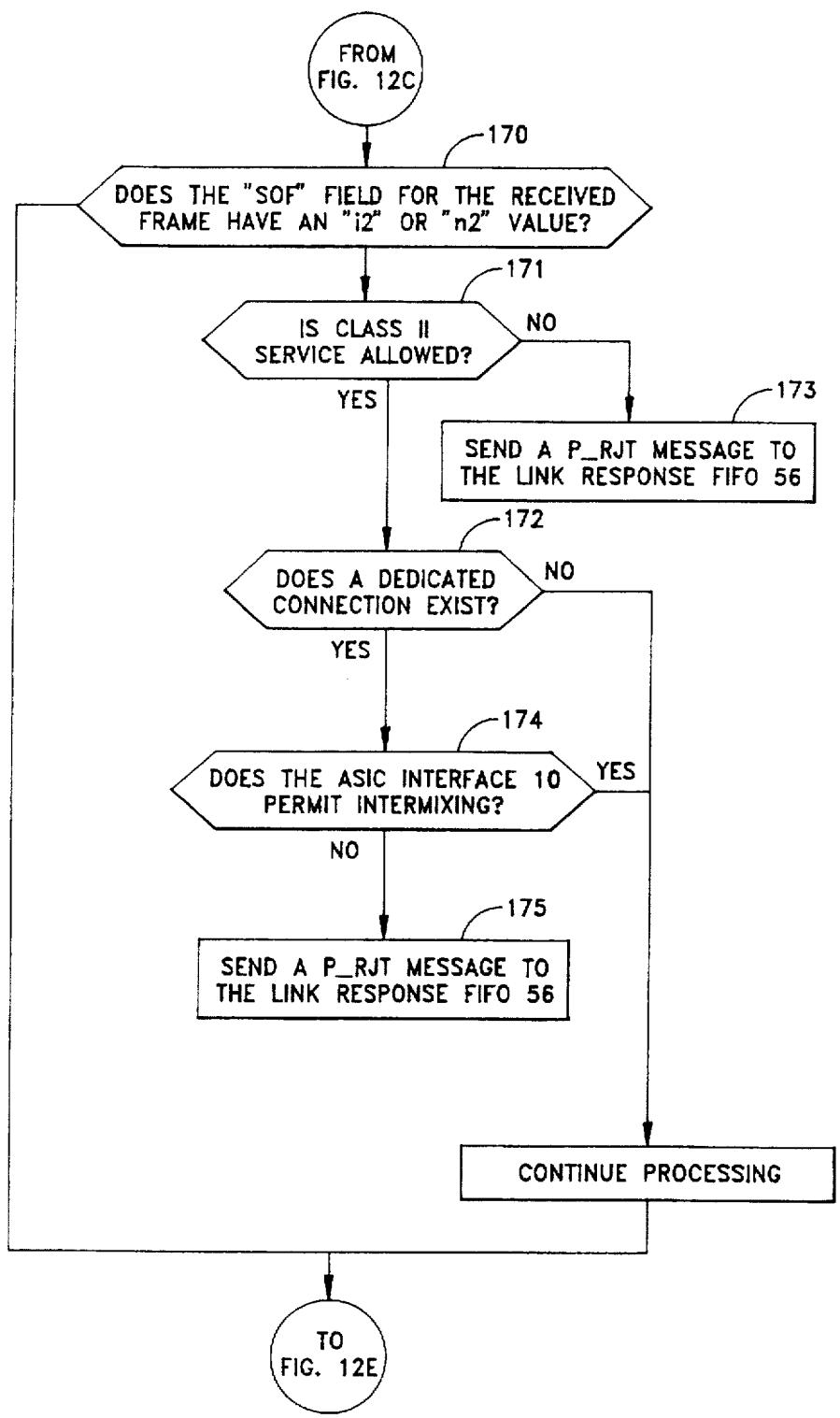

If the SOF field for the received frame is not characterized by any of the "c1", "i1" or "n1" values, additional tests are determined for Class II service with control diverting to step 170 in FIG. 12D from step 161 in FIG. 12C. In this particular testing sequence, a test for Class II capability is conducted in step 171, and a test for a dedicated connection in step 172. If Class II service is allowed and the connection is not dedicated, processing continues. If the Class II service is not allowed step 173 issues an appropriate P_RJT message to the link response FIFO 56. It is possible in Class II service to have both a dedicated connection and a non-dedicated connection. Step 174 determines whether such intermixing is permitted. If it is, processing continues, if not, an appropriate P_RJT message is generated in step 175.

If the ASIC interface 10 is adapted to operate with other classes of service, additional but corresponding tests of the SOF field can be further implemented using the same basic approach as shown with respect to FIGS. 12B, 12C and 12D. Such testing is indicated by reference numeral 176 in FIG. 12E.

Figure 12E:
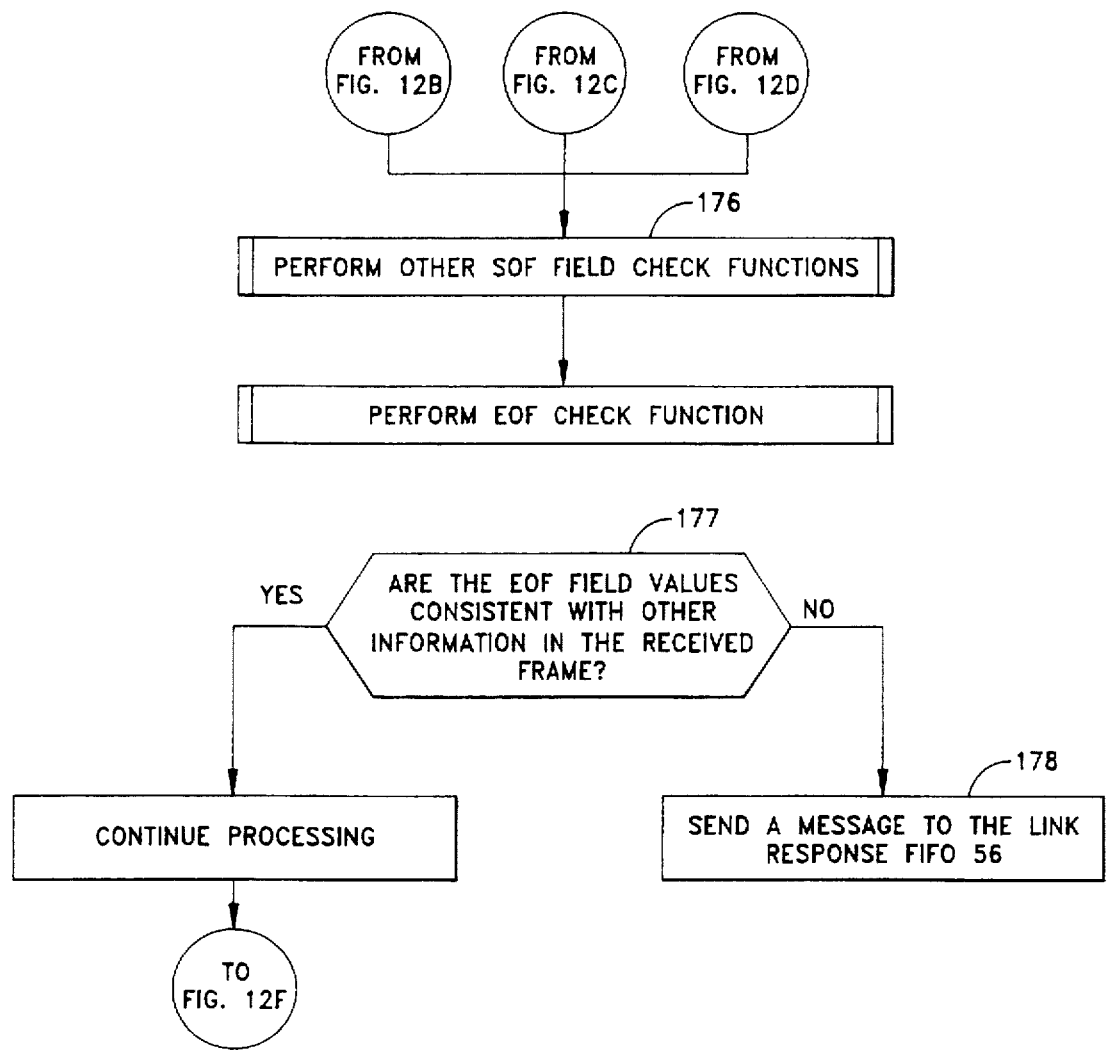

Once all testing of the SOF field is completed, the EOF field in the data frame is tested as specifically shown in FIG. 12E. Step 177 determines whether the EOF field value for a given data frame is consistent with other information in the received frame. If it is, control transfers to FIG. 12F; otherwise an appropriate P_RJT message is sent to the link response FIFO 56.

Figure 12F:
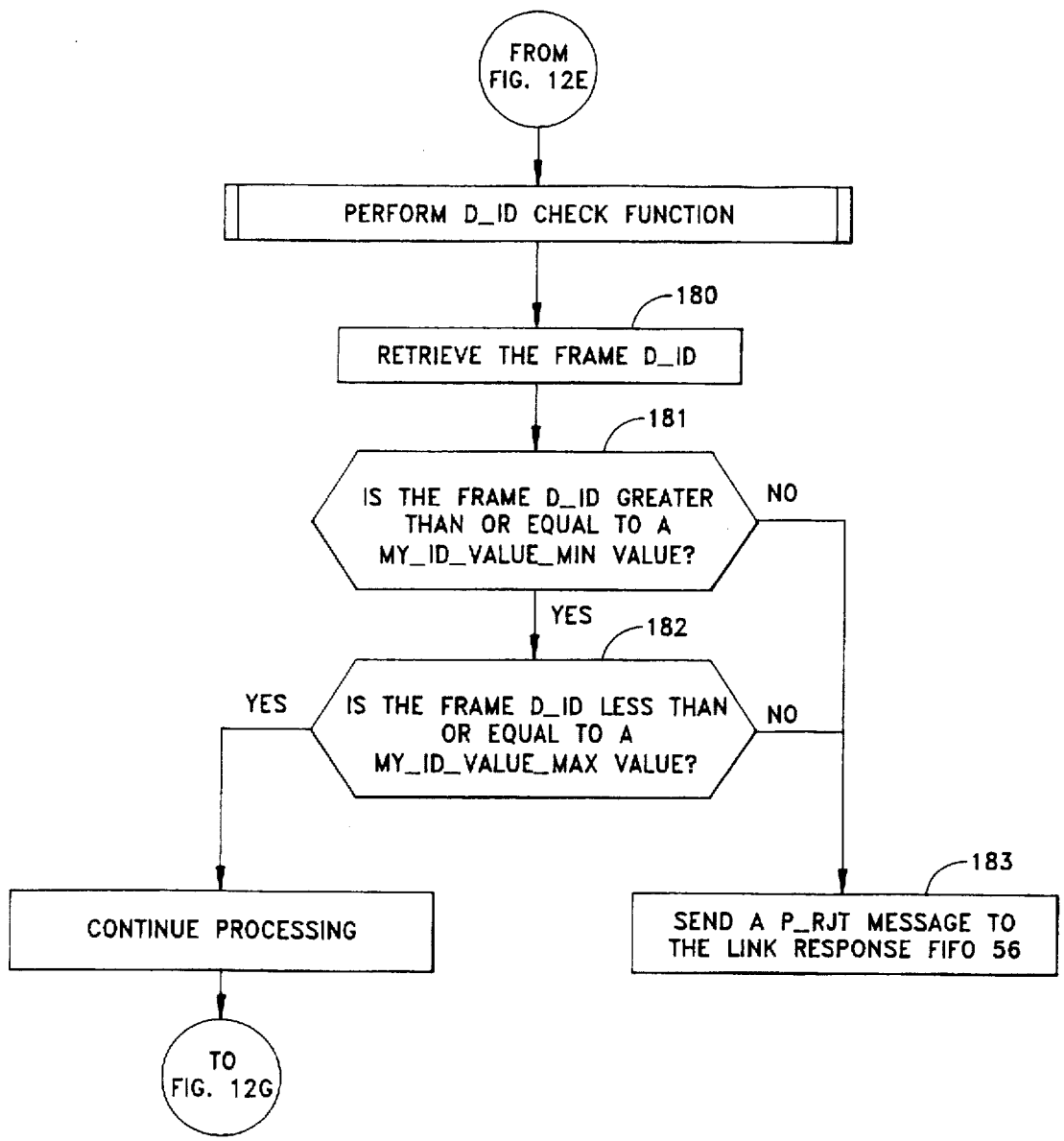
Figure 12G:
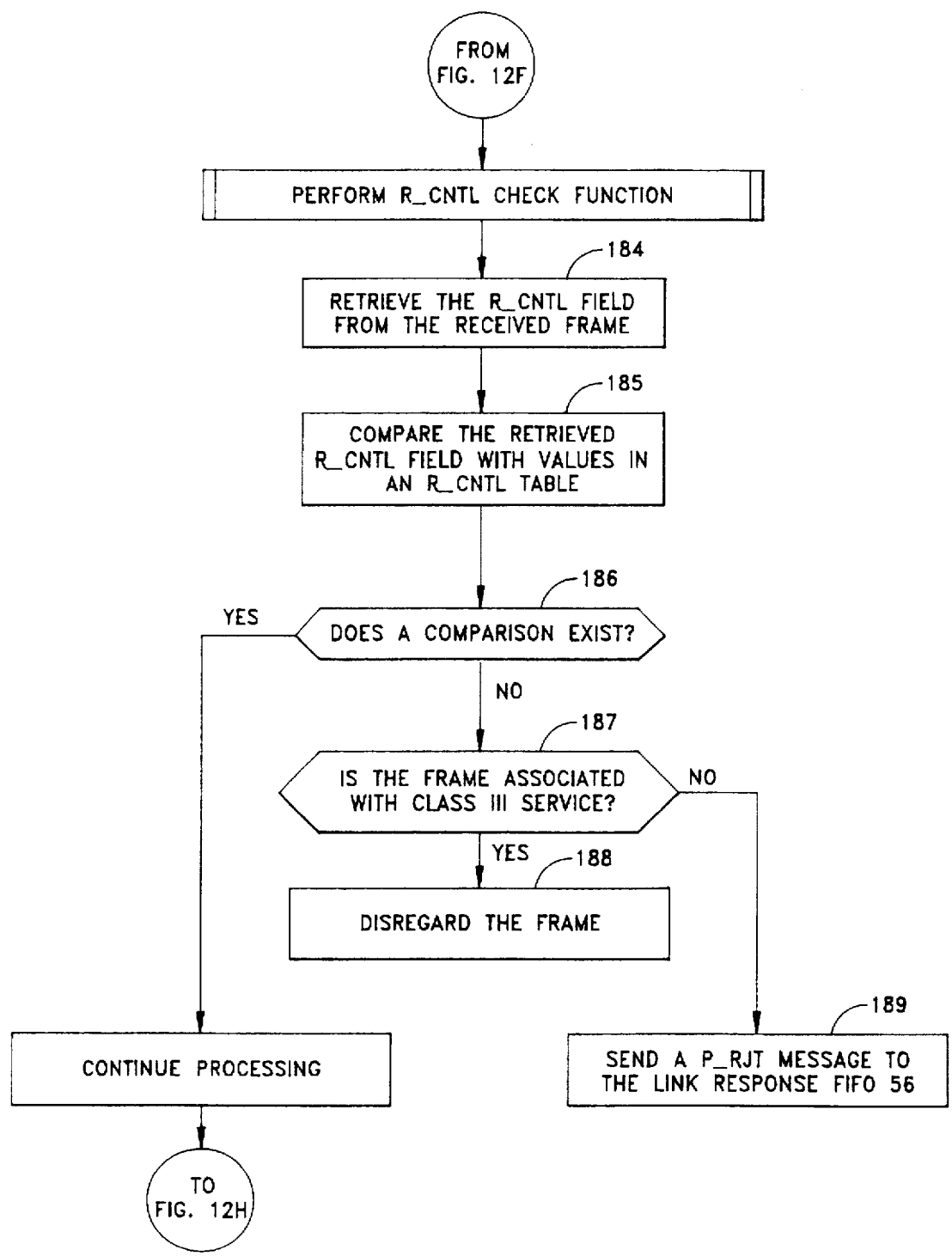

In FIG. 12F the destination identification field in the data frame header is checked to determine whether it is in the range allocated to the ASIC interface 10. As shown in FIG. 11 A MY_ID_VALUE_MIN and MY_ID_VALUE_MAX registers 125 define a range of addresses. In accordance with FIG. 12F, the processor control 110 retrieves the frame destination identification from the frame header in step 180 and tests to determine if it is greater than the MY_ID_VALUE_MIN value in step 181 and less than the MY_ID_VALUE_MAX value in step 182. If these two tests show that the data frame destination identification is within the appropriate range, processing continues by transfer to FIG. 12G. Otherwise an appropriate P_RJT message is transferred to the link response FIFO 56 in step 183.

Figure 12H:
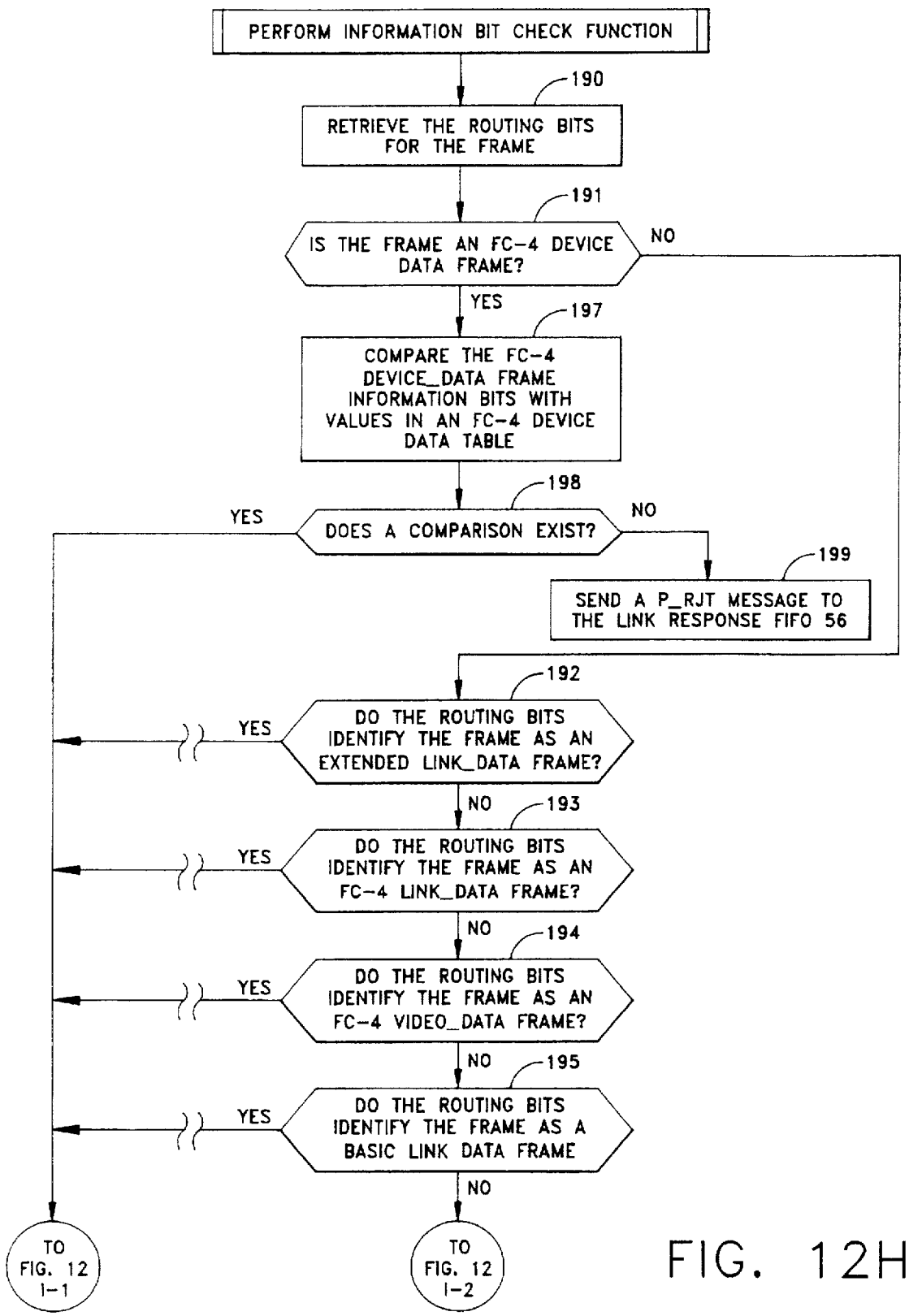

Next as shown by step 126 in FIG. 12 the preprocessor control 110 checks the R_CNTL in the header that defines the frame type as containing, (1) a data field length of zero, (2) a data field length indicating a link control frame or (3) a data link field of between 0 and 2112 bytes (i.e., a data frame). The preprocessor control obtains the R_CNTL field in step 184 in FIG. 12G and compares that field to values in a R_CNT table 127 shown in FIG. 11. This occurs in step 185. If the retrieved value from step 184 matches any of the values in the table 127, step 186 determines that a comparison exists and control transfers to FIG. 12H. If a comparison does not exist, then, in this particular embodiment, subsequent actions are determined by the class service being processed. If Class III service is being processed, step 187 diverts to step 188 so the system disregards the frame altogether. For any other class, step 187 diverts to step 189 where the process control retrieves a value from the interrupt reason code table 137 and transfers a P_RJT message to the link response FIFO 56.

The data frame header also includes an information bit field which, for different frame types, has predetermined values. The preprocessor control 110 uses the process in FIGS. 12H and 12I to complete this processing. Specifically the preprocessor uses step 190 to retrieve the R_CNTL bits from the header register 115 in FIG. 11 and determines the type of data frame through a series of tests shown in steps 191, 192, 193, 194, 195 and 196 with respect to the tests for an extended LINK_DATA frame an FC-4 LINK_DATA frame, an FC-4 VIDEO_DATA frame and a basic LINK_DATA frame. In steps 192 through 195, the tests follow the same course as those for an FC-4 DEVICE_DATA FRAME. Thus only that test is shown in any detail. Specifically, if the frame is an FC-4 DEVICE_DATA frame, step 191 transfers to step 197 where the preprocessor control 110 compares the information bits with predetermined values for an FC-4 DEVICE_DATA frame from the information bit table 131. If a comparison exists in step 198, the system continues the processing. Otherwise the system transfers to step 199 and transfers an appropriate P_RJT message to the link response FIFO 56. As depicted by the broken lines from the "YES" exits of each of the decision blocks 192 through 195, corresponding tests yield corresponding results, by inspection of FIG. 12I, complete the information bit testing.

Figure 12I:
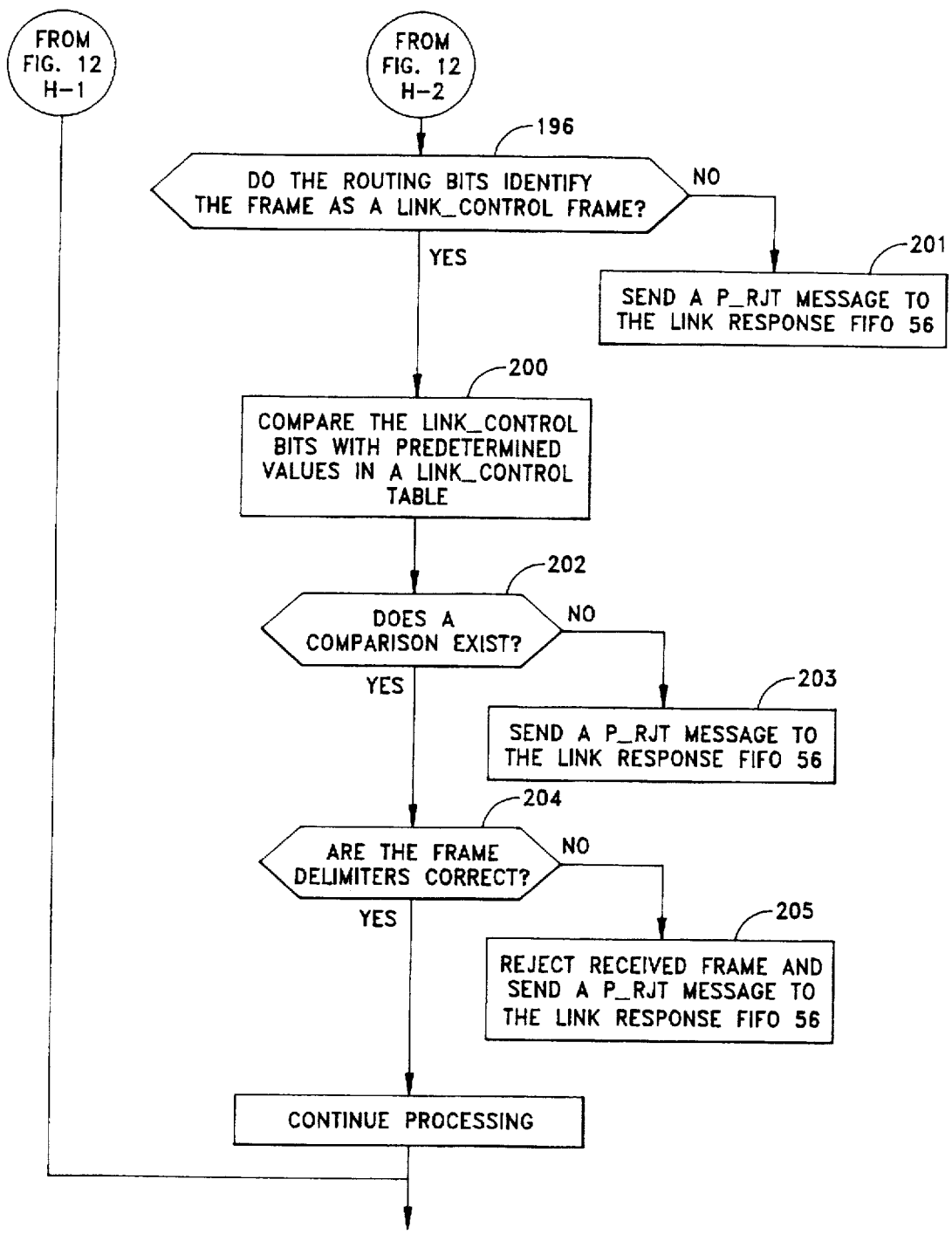

Referring to FIG. 12I, the data frame is a LINK_CONTROL frame, step 196 transfers control to step 200 in FIG. 12I. If the test in step 196 is not satisfied, then the R_CNTL bits do not disclose any known data type and control transfers to step 201 under which the preprocessor control 110 transmits another P_RJT message to the link response FIFO 56.

If the data frame is identified as a LINK_CONTROL frame, step 200, like the other tests, determines whether the information bits correspond to predetermined values. If a comparison does not exist, step 202 diverts to step 203 and a P_RJT message is sent to the link response FIFO 56. If a comparison exists, step 204 determines whether the frame delimiters are correct. If they are not, the preprocessor control 100 produces an appropriate P_RJT message for transfer to the link response FIFO 56 (step 205) and rejects the received frame. Otherwise, processing continues in accordance with other aspects of the operation of the ASIC interface 10.

As will now be appreciated, the frame preprocessing circuit 53 shown in FIGS. 4, 11 and 12, performs a number of straight forward functions. These are readily performed by a hardware state machine. Consequently, the frame preprocessing circuit 53 is readily adapted for implementation in an application specific integrated circuit.

During the foregoing operations, the frame preprocessing circuit 53 transfers information to the sequence management circuitry 19. As previously indicated, the recipient sequence manager 60 and recipient cache manager 61 in FIG. 5 operate together to process incoming data frames and appropriately route information within the system. The recipient sequence manager 60 in fact performs most of the functions associated with a standard data channel protocol, such as a fibre channel protocol.

Generally speaking the recipient sequence manager 60 reads the encoded class headers provided by the frame preprocessing circuitry. It operates in conjunction with the recipient cache manager 61 to perform context switching in response to interrupt conditions. The recipient sequence manager 60 processes header information in a data frame based upon rules for the appropriate class of service and processes the sequence control block to gain appropriate pointers into the memory associated with the data system. The recipient sequence manager 60 additionally calculates proper address locations for transfers onto the bus 12 and controls the DMA memory transfer circuit 62 in order to transfer information to any memory connected to the bus 12. In addition the recipient sequence manager 60 controls the memory transfer circuitry 62 to fetch data descriptor blocks and to deliver current sequence control blocks, increments a transmit R_RDY counter to indicate the need to transmit an R_RDY primitive signal, generates and queues appropriate ACK frames, generates and queues RJT frames, processes ABORT_SEQUENCE protocols, periodically requests time out value checks for the recipient cache manager block to determine if any time outs have occurred and programmably initiates interrupt requests through the interrupt manager 63.

United States patent application Ser. No. 08/363,392 describes context switching in detail. It is sufficient for purposes of understanding this invention to state that context switching is a process whereby a current register set in the recipient sequence manager 60 is swapped for another register set containing information pertinent to the received frame. This operation occurs at any time an incoming data frame does not match the context currently loaded into the recipient sequence manager 60. The switching occurs only between the recipient sequence manager 60 and the memory system at the memory interface circuitry 16 so that the transfers occur with minimal latency. It is only the size of the local memory that controls the potential number of context switches so essentially an infinite number of sequences may be supported.

Basically the recipient sequence manager 60, as described in the foregoing application, determines if a context switch is required by comparing tags. A tag is the concatenation of a S_ID source identification, an OX_ID field that carries an exchange identifier provided by the source and an SEQ_ID field that contains an identifier of the sequence or packet with which the frame is associated. The recipient sequence manager 60 maintains an Old_Tag register and a New_Tag register. The Old_Tag register defines the current context; the New_Tag register, the context of a newly received frame.

The recipient cache manager 61 includes memory address registers 212 for identifying the location of the data frame in the memory system 16 shown in FIG. 1 as well as the location of the tags in that memory system, as well as other registers. For example, the memory system 16 comprises a tag memory section and an SRCB data memory section addressed by certain of these registers. When the comparison of New_Tag and Old_Tag yield different results, the recipient sequence manager 60 begins a process by which the current context is saved and the system obtains new context data from the memory system 16. The context is maintained as the sequence recipient control block (SRCB) and initial information is provided by the data processing system through the data system interface circuit 14 in FIG. 1 to SRCB memory address registers 211. It is this use of context switching, as described in the foregoing patent application, that enables the receipt of data frames out of order over a fabric net with minimal delays.

The recipient sequence manager 60 also processes header information once it is determined that the SRCB registers and locations contain all necessary information. As described in the foregoing application, the recipient sequence manager 60 receives and processes data on a frame by frame basis so that a reassembly can be done on the fly. The recipient sequence manager 60 also includes longitudinal redundancy checking circuit 217 that calculates parity for each bit position for all words in a logical block. This circuit operates assuming that the sequence will arrive in order. When a result is obtained, it is appended to each logical block that is transferred through the data system interface 14 to the memory 15M.

Figure 13:
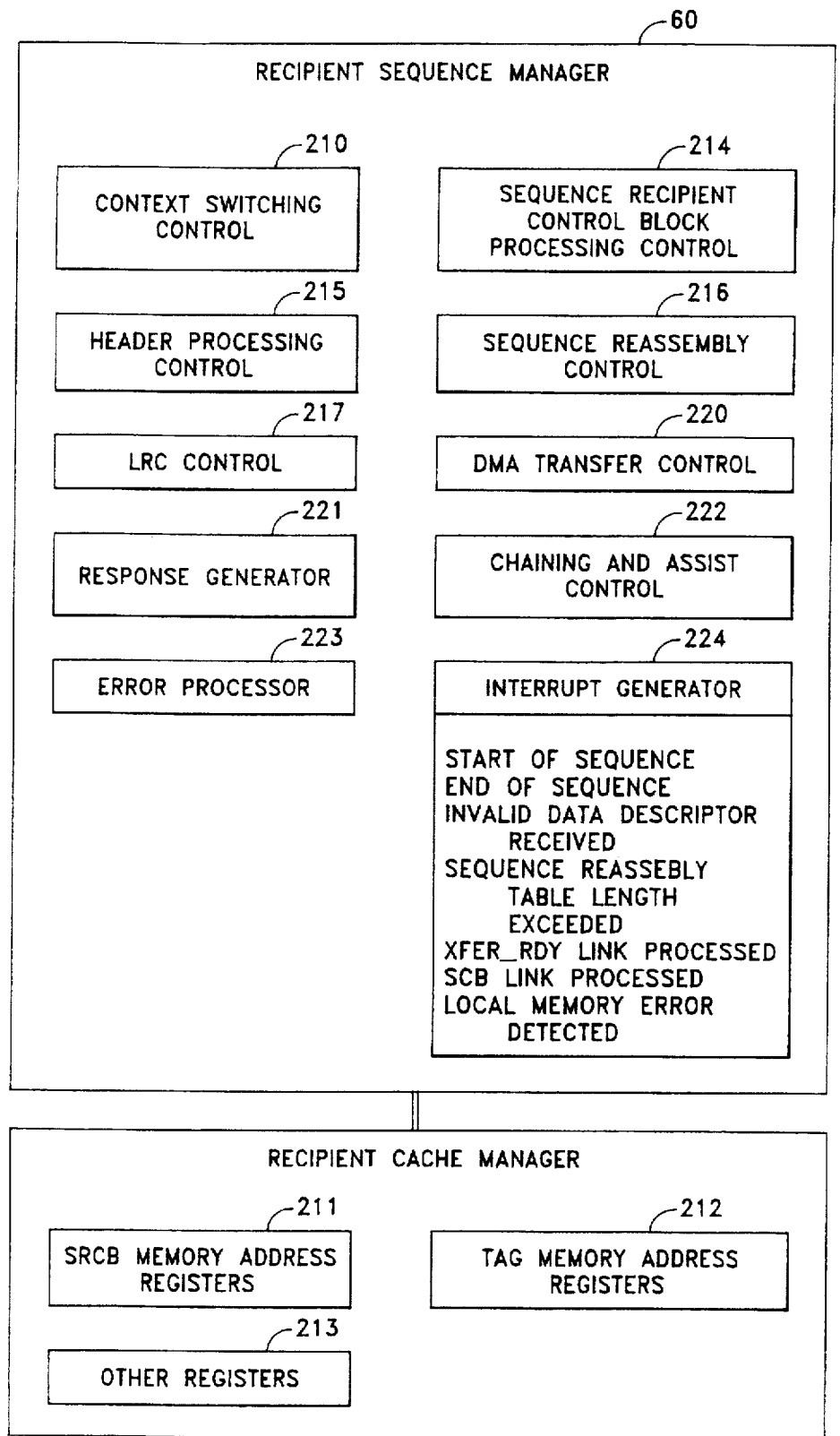
FIG. 13 is a block diagram of portions of a recipient sequence manager and represent cache manager shown in FIG. 5.

Still referring to FIG. 13, a DMA transfer control circuit 220 controls transfers primarily between the memory system 16 in FIG. 1 to the memory 15M in FIG. 1. The recipient sequence manager 60 also utilizes DMA transfers to manage structures by retrieving data descriptors and returning contents internal to the recipient sequence manager 60. The DMA transfer control 220 additionally enables the transfer of SRCB response portions back into the memory 15M and provides other services as necessary to comply with the operations required by the data channel such as the fibre channel 11 in FIG. 1.

In certain applications it may be acceptable to operate the system with reduced capabilities by eliminating the local memory system 16. Although the connection for the ASIC 10 still remains, the function of the local memory system 16 transfers to the system memory 15M. The ASIC 10 is readily adapted to this operating mode by including a "bypass" code in the other registers 213 and to modify the operation of the recipient sequence manager 60 so that is responds to an appropriate value of the "bypass" code by conditioning the DMA transfer control 220 to transfer data directly from the data FIFO buffer 52 to the system memory 15M.

A response generator 221 in FIG. 13 generates appropriate acknowledgements and busy messages. The response generator 221 will produce acknowledgements after all the data in a current frame has been successfully transferred to the system memory 15M. An acknowledgement is not generated, however, until the memory transfer circuitry 62 in FIG. 5 indicates that all transfers associated with a data frame have been properly transferred. In certain classes errors are indicated by sending a BSY signal. The response generator 221 does not produce any rejection messages; those are a function of the frame processing circuit 18 shown in FIG. 3.

A chaining and assist control 222 enables the system to link multiple control blocks together in a command stream. As an example, if the ASIC interface 10 at a host location in a network and receives a write FCP command, the interrupt manager 63 in FIG. 5 issues an appropriate interrupt to the data processing system 15 in FIG. 1. The data processing system 15 then allocates appropriate cache locations in the memory system 16 and produces appropriate data descriptor table entries and cache entries for initializing the ASIC interface 10 for the write FCP. This will include a number of sequence control blocks or SCB's including one for the data and another for the response. The data processing system 15 will transfer linked pointers to those blocks back to the recipient sequence managing circuit 19 in FIG. 1 so that upon receipt, the frame processing circuit 18 will transfer back a response to the fibre channel indicating that the ASIC interface 10 and related system are prepared to initiate the transfer. Thus the recipient sequence manager 60 and initiator sequence manager 64 are both utilized in such a transfer.

An error processor 223 in FIG. 13 processes abort sequence protocols where another port or network node aborts a transfer or where application software in the data processing system 15 in FIG. 1 aborts the sequence. In the former case the sequence manager 19 in the ASIC interface 10 terminates the transfer according to known protocols and then sets appropriate flag bits in the SRCB. In the latter case, the recipient sequence manager 60 includes an Abort_Tag register (not shown) that receives a concatenation of identification fields from the sequence control block. Each time the recipient sequence manager 60 begins a new processing cycle it examines this register to determine if an entry is made. If the information in the Abort_Tag register indicates that the sequence is to be aborted, a stop sequence protocol begins and when completed, the recipient sequence manager 60 will set an appropriate flag.

Figure 14:
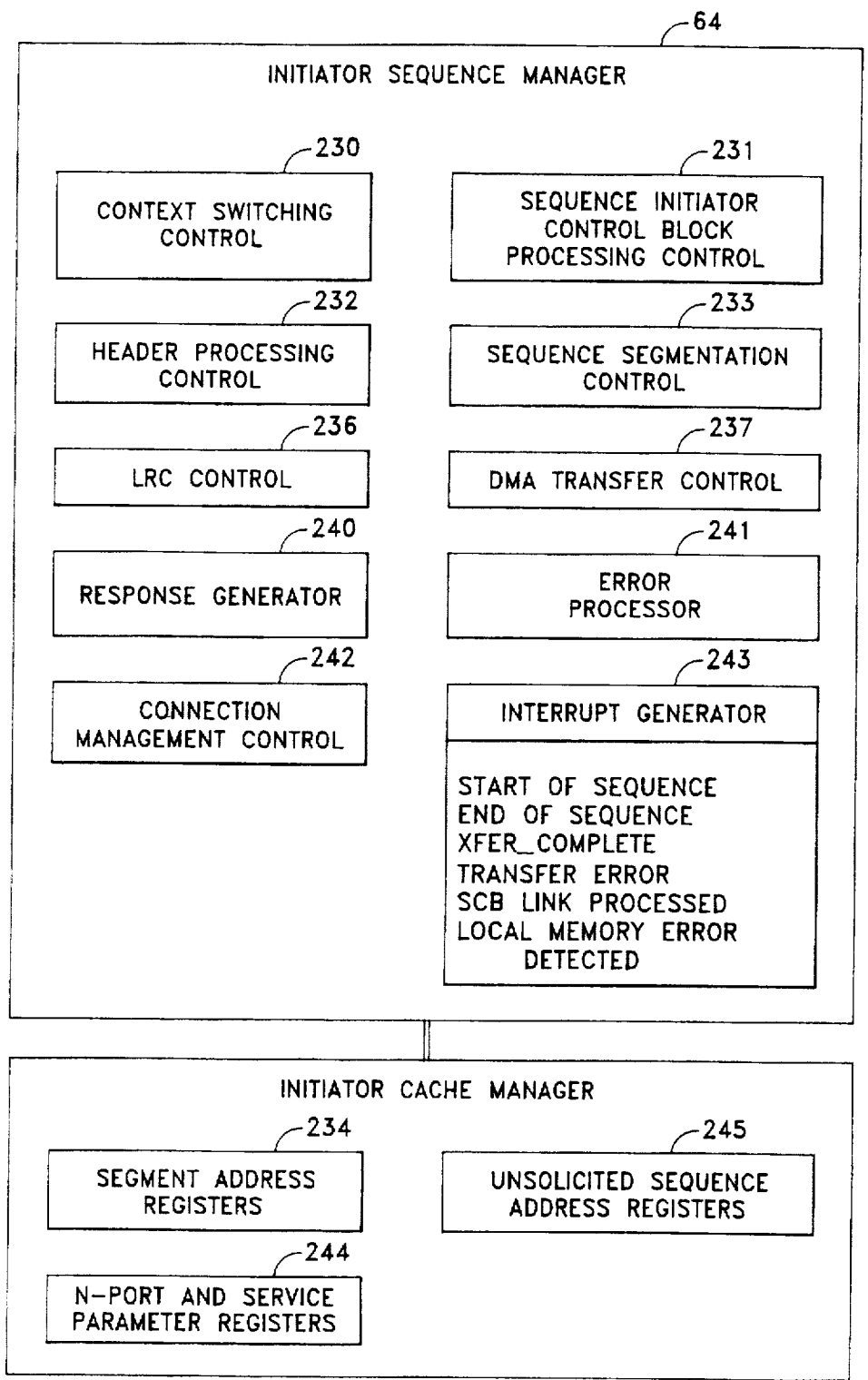
FIG. 14 is a block diagram of portions of an initiator sequence manager and initiator cache manager shown in FIG. 5.

FIG. 14 depicts the structure of the initiator sequence manager 64 and initiator cache manager 65, by functional blocks. The initiator sequence and cache managers 64 and 65 are similar to the recipient sequence and cache managers 60 and 61. A context switching control 230 performs context switching that is analogous to that performed by the context switching control 210 in FIG. 13, but under different circumstances. If the ASIC interface 10 is providing Class I service, an entire sequence will be transmitted. The context switching control 230 requests or initiates an operation to begin another pending sequence only after all frames have been transmitted. When the transfer involves Class II or III service, a register can be programmed for determining the number of frames the initiator sequence manager 65 will transmit in a sequence before giving up ownership of the link and requesting a context switch. In this event the context switching control 230 will retrieve another initiator control block for the initiation sequence manager 64. If this register is set to zero, the entire sequence will be transmitted before a context switch is requested just as it occurs in Class I service.

When Class IV or V service is involved, a VC_RDY primitive is, as known, indicates whether the fabric is ready for a Class IV or V frame. The context switching control 230 processes this VC_RDY message and a VC_ID field as part of that message will provide an index into the memory system 16 in order to retrieve the initiator control block. When the frame is sent, another context switch will occur. In these transfers the initiator sequence manager 65 and initiator cache manager 66 utilize Old_Tag, New_Tag and current context data in the initiator cache manager 65.

A sequence initiator control block processing control 231 maintains any context as part of a sequence initiator control (SICB) block. Before frame processing can begin for purposes of transferring a frame out of the system memory 15M, the initiator sequence manager 64 determines whether a data descriptor is loaded in a corresponding register. If a DD valid flag in the data descriptor indicates an invalid data descriptor, the control 231 initiates a transfer through the memory transfer circuitry 62 in FIG. 5. Circuitry represented by block 231 additionally performs interim calculations required for proper sequence operations including LRC calculations and manipulates transmission counters and pointers in the current sequence status block for the data channel. When a sequence is completed, the SICB block will be transferred back through the memory transfer circuitry 62 in FIG. 5 to the memory 15M in FIG. 1 as an appendage to an initial sequence control block as a response. The data processing system 15 in FIG. 1 then uses this information to determine sequence status.

The initiator sequence manager 64, like the recipient sequence manager 60, is a multi-tasking hardware implemented state processor. It requires a data structure to maintain current context information to properly process a sequence. This context and other information is provided in the SICB block and each sequence consumes one such block. Like the SRCB blocks, the local memory 16 in FIG. 1 stores the SICB blocks. The initiator sequence manager 64 maintains an SICB block for each unique combination of a source identification, sequence identification and OX_ID exchange information value until all the sequence data has been transmitted or an error condition aborts the sequence. The sequence manager 64 also includes a set of registers, not shown, to operate on the current context, such as New_Tag, Old_Tag, S_ID, OX_ID, SEQUENCE_ID and related registers as previously stated. These registers receive the information from the corresponding SICB block stored in the memory system 16. As known, a typical SICB contains host processor request in the first twelve words. The initiator sequence manager 64 maintains the next twelve words that include intermediate LRC calculations, DMA calculation accumulators and initiator sequence manager state information.

Also like the recipient sequence manager 60 and recipient cache manager 61, the initiator sequence manager 64 operates in concert with the initiator cache manager 65. When a context switch is made under any of the foregoing situations, the current context data is read by the initiator cache manager and stored in the local memory system 16 in FIG. 1. If the most significant bit of a New_Tag register is set, the initiator sequence manager 64 uses the new tag to find appropriate context. Otherwise the next active SICB block is located. When this occurs, the data in the corresponding SICB block is stored in the initiator sequence manager 64 by the initiator cache manager 65. When these transfers are completed, the initiator sequence manager 64 has the appropriate context and frame processing may continue.

Still referring to FIG. 14, a header processing control 232 generates a header for transfer through onto the fibre channel 11 after the control 231 determines that the SICB block contains all necessary information. The header processing control 232 uses internal state tables that depend upon the class of service.

A sequence segmentation control 233 breaks a block of data into individual frames. The header processing control 232 operates in conjunction with the sequence segmentation control 235 to produce a header for each data frame. The sequence segmentation control 233 includes a register 234 in the initiator cache manager for addressing another register (not shown) for maintaining a sequence count that is incremented each time the frame is transmitted. In order to facilitate the transmission of a frame without further involvement of the data processing system 15, the initiator sequence manager 64 will embed a current relative offset with every frame notwithstanding whether it will subsequently be used. The sequence segmentation control 235 additionally will attempt to place an entire logical block and only one logical block into a fibre channel frame. However, if the block is sufficiently large it either can be split into multiple frames or can be processed using "frame packing" techniques.

When it is determined that a data transfer should occur onto the fibre channel 11, an exchange management program in the data processing system, will, as known, construct a sequence control block structure. This structure includes sequence parameter information, a header template and memory pointers. The exchange management program transfers this information to the initiator sequence manager 64 and cache manager 66 to establish a queue that contains a number of pointers that identify the location of these SICE blocks in the memory system 16.

One of the items in the SICB is a HEADER_PER_PAYLOAD bit. If that bit is set, the initiator sequence manager 65 expects a complete header that will include the sequence identification, sequence count and related information. A local block size parameter is also supplied in the SICB. An LRC control uses this block for calculating LRC codes. A frames-per-ownership parameter can comprise a multiple bit field that establishes a maximum number of frames that can be sent in sequence before servicing another active pending sequence. In one embodiment a six-bit field enables up to 64 data frames to be sent.

When a sequence transmission has been completed, the initiator sequence manager 64 uses a DMA process control 237 to append portions of the SICB block to the original control block; this becomes a response block, that transfers to the memory 15M. This terminates the sequence operation.

Like the recipient sequence manager 60, the initiator sequence manager 64 also uses the DMA transfer control 237 to fetch data descriptors and return contents internal to the sequence manager, in addition to the other functions previously described. Moreover the initiator sequence manager 64 cal also operate in a mode that moves data directly from the system memory 15M to the fibre channel 11 in those applications where it is sufficient for the system memory 15M to act for its normal purpose and to act as the local memory system 16.

A response generator 240 is responsible for appending acknowledgements, rejection messages and busy messages to a transmitted sequence. An acknowledgement (ACK) is sent to indicate the current state of the sequence and to manage End-to-End credits that form a portion of the data channel protocol. A sequence is deemed to be complete when all ACK_1 bits have been received, or an ACK_0 message has been received or an appropriate number of ACK_N messages have been received. If an RJT message is to be sent, it normally will begin an abort sequence protocol.

An error processor 241 handles the abort sequence protocol and also instructions from the data processing system 15 to terminate an operation. The error processor 241 will generate a message that will enable another port connected to the fibre channel 11 to abort the sequence in an orderly fashion. Corresponding flag bits are set in a status field. Like the error processor 223 in the recipient manager 60 shown in FIG. 13, the error processor 241 responds to a termination command from the data processing system 15 by utilizing the contents of an abort tag register that concatenates the other ID and originator exchange ID fields. The initiator sequence manager 64 examines this register each time it begins a new processing cycle to see if an entry has been made. If there is a match between the current OTHER_ID and the OX_ID tags, a stop sequence protocol begins. The initiator sequence manager 64 will, in conjunction with the interrupt manager 66 interrupt the data processing system 15 upon completion and establish appropriate values in the status field.

A connection management control 242 controls the transmit portion of a connect management sequence. As known, whenever a new sequence is requested to be transmitted over Class I service, it is necessary to determine whether a Class I connection exists. If the initiator sequence manager 64, through the connection management control 242, determines a Class I connection exists, the control 242 will either skip over the connection if it is a dedicated connection that is with a location other than the requested destination or by transmitting the data. If a connection does not exist, the control 242 establishes one by sending a first frame of an SOF (C1) message and then wait for a response acknowledgement. As previously indicated, incoming connection management is handled by the frame processing circuit 18, particularly the frame preprocessing circuitry 53 shown in FIG. 4.

Still referring to FIG. 14, an interrupt generator 243 produces an appropriate interrupt for transfer to the interrupt manager 66 in FIG. 5 under a number of conditions. Specifically, the interrupt generator 243 produces a "Start of Sequence" interrupt upon starting the receipt of data in a new sequence. An "End of Sequence" interrupt indicates the completion of the receipt of data in a sequence. An XFER_COMPLETE interrupt indicates that a current sequence transfer has been completed successfully. A "Transfer Error" interrupt, however, indicates that some error has occurred during the transfer. An "SCB Link Processed" interrupt indicates that all the operations required to complete an SRCB link have been completed. A "Local Memory Error Detected" interrupt indicates to the data processing system 15 that an error has occurred in the memory system 16.

The initiator cache manager 66 additionally includes in port and service parameter registers 244 and unsolicited sequence address registers 245 for use in other actions known in the art.

As will now be apparent, the local memory manager 63 in FIG. 5 establishes data paths between the system memory 15 and local memory 16 in FIG. 1 to enable DMA transfers between the memories. As previously indicated, the memory system 16 comprises external RDRAM memory. This memory cannot be formed on the integrated circuit chip. However, the location of the local memory system externally of the ASIC interface 10 provides two basic advantages. First RDRAM memory is extremely fast so that very high transfer rates into and out of the memory occurs. These rates minimize any latency that would exist with other slower memories. Second, the local memory system can be sized for any particular application without modifying the ASIC interface 10. In one embodiment, for example, the local memory systems 16 has 4 megabyte capacity.

FIG. 15 depicts the various types of transactions that the local memory manager 63 must provide. Specifically, when a frame is received in the frame reception circuit 50 of FIG. 4, that frame reception data transfers from the received data FIFO 52 in FIG. 4 to the local memory system 16 as shown at 250. A transfer is completed when the memory transfer circuit 62 in FIG. 5 transfers data frames from the local memory 16 to the data system 15, particularly the system memory 15M as shown at 251. During the receipt of data frames, the recipient sequence manager 60 and recipient cache manager 61 utilize registers to provide data reassembly as at 252, by which the information in those registers is sent to the local memory 16 and recipient control blocks which are received from the local memory into the registers to establish context for a transfer as at 253.

When the operation requires a transfer of data frames from the system memory to the fibre channel 11 in FIG. 1, the initiator sequence manager 64 moves initiator control block information into the local memory 16 from registers loaded by the data processing system into the local memory 16 at 354. The initiator cache manager 65 utilizes this information from the local memory 16 for storage in other registers associated with the initiator cache manager 65 in connection with other initiator control block operations at 255. The local memory manager 63 additionally moves data from the data system 15 to the local memory system 16 at 256. The frame transmission circuit 55 in FIG. 3 moves data frames from the local memory system 16 through the transmitted data FIFO buffer 57 in FIG. 3 at 257 and then onto the fibre channel. Circuitry for implementing these transfers is well known in the art. Giving the source and destination of each item of information and the general path over which that information travels enable a person of ordinary skill in the art to construct such a local memory manager.

Similarly, the memory transfer circuit 62 is essentially a conventional DMA transfer control circuit that includes address registers, data buffers and gating organized as a hardware state processor for effecting DMA's utilizing the necessary timing signals required by the local memory system 16, the sequence management circuit 19 and the data processing system 15 as shown in FIG. 1. Given those parameters it is within the capability of a person of ordinary skill in the art to define such a memory transfer circuitry for implementation on an application specific integrated circuit.

The ASIC interface 10 described with reference to FIGS. 1 through 15 has an architecture whereby the ASIC interface 10 can connect to a high speed data channel 11 such as a fibre channel, a local high speed memory 16 such as a RDRAM memory, and a data processing system 15 for establishing high speed transfers between the data processing system 15 and the high speed channel 11. All the components of this interface comprise a combination of registers and gating circuits readily adapted for forming a state processor that is readily implemented in integrated circuit technology. Consequently, the ASIC interface 10 as disclosed herein is located on a single application specific integrated circuit that fully controls all transfer operations. The flexibility is provided by enabling the data processing systems to address certain registers within the ASIC interface 10 in a high-level supervisory mode. Moreover the system, by virtue of being interrupt driven and by virtue of having an ability to transfer interrupt response reasons, is capable of communicating with the data processing system thereby to provide necessary supervisory information. However as will be apparent this system, once it obtains all the necessary information required to effect a transfer, the ASIC interface 10 actually performs the transfer independently of the data processing system other than the participation required to effect DMA transfers into the system memory.

An ASIC interface, such as that as disclosed, can connect diverse high-speed data channels by incorporating a multiple port interface circuit at the data channel. This further facilitates the flexibility of the system because the ASIC interface can connect to duplex paths such as a fibre channel or Ethernet connection or to other parallel paths such as SCSI buses. Moreover in accordance with other objects of this invention, the reliability of an ASIC interface constructed as a single application specific integrated circuit is greatly enhanced.

This invention has been described with respect to a particular implementation of an ASIC interface for interconnection with high speed data channels such as fibre channels, Ethernet channels or SCSI buses. It will be apparent, however, that many modifications could be made to the specifically disclosed implementation by eliminating certain specific features or adding others. Any such variations and modifications as are desired can be made without departing the spirit and scope of this invention. Therefore, it is the intent of the appended claims to cover all such variations and modifications as come within the true spirit and scope of this invention.

What is claimed as new and desired to be secured by Letters Patent of the United States is:

1. An application specific integrated circuit interface for interconnecting an external local memory system, a data channel that conveys information as information frames having header and data portions, a data system that includes a data system memory and an input-output bus having a predetermined format for transfers, said integrated circuit comprising:

(A) a first connection circuit for connection to the data channel, (B) a second connection circuit for connection to the input-output bus, (C) a third connection circuit for connection to the external local memory system, (D) a frame processing circuit connected to said first connection means for dividing and combining the header and data portions of information frames received from and transmitted to the data channel, and (E) a sequence managing circuit connected to said frame processing circuit and said second and third connection circuits for managing the transfer of information to and from the data channel through said frame processing circuit, said sequence managing circuit including (i) a first transfer control circuit connected between said frame processing circuit and the third connection circuit for controlling the transfer of the data portions between said frame processing circuit and the external local memory connected to said third connection circuit, and (ii) second transfer control circuit connected between said second and third connection circuits for transferring data between the external local memory and the data system input-output bus.

2. An interface as recited in claim 1 wherein the data channel information is in serial form and said frame processing circuit uses data in parallel form and wherein said first connection circuit includes a serial-deserializer circuit for connection to said frame processing circuit for converting information between the serial and parallel forms.

3. An interface as recited in claim 2 wherein the data channel comprises transmitting and receiving differential transmission paths and said serial-deserializer converts serial signals on the receiving differential transmission path into a parallel format for said frame processing circuit and converts parallel signals from said frame processing circuit to a serial format compatible with the transmitting differential transmission path.

4. An interface as recited in claim 3 wherein said first connection circuit is adapted to connect to a plurality of data channels and additionally includes an arbitration circuit for selecting connections to one of the paths.

5. An interface as recited in claim 2 wherein said first connection circuit is adapted to connect to the serial data channel and additionally comprises a parallel connection for a parallel data channel and an arbitration circuit for selecting one of said data path connections for subsequent communications with said circuit.

6. An interface as recited in claim 2 wherein said frame processing circuit includes reception and transmission data buffers in parallel data paths between said first connection circuit and said sequence managing circuit.

7. An interface as recited in claim 6 wherein said frame processing circuit includes a frame reception circuit and a frame transmission circuit for receiving from and transmitting to the first connection circuit information frames including header information and data, said frame reception and transmission circuits being connected respectively to said reception and transmission data buffers.

8. An interface as recited in claim 7 wherein said frame processing circuit additionally comprises a frame preprocessing circuit for responding to header information from said frame reception circuit and for generating header information for said frame transmission circuit.

9. An interface as recited in claim 8 wherein said frame reception circuit includes a header buffer for receiving header information for each information frame and said frame preprocessing circuit includes circuits for monitoring the headers stored in said header buffer.

10. An interface as recited in claim 2 wherein said third connection circuit includes a local memory interface circuit and a local memory manager circuit for controlling transfers through said local memory interface circuit in response to said second transfer control circuit, said second transfer control circuit effecting direct memory access transfers between the input-output bus and the memory system.

11. An interface as recited in claim 10 wherein said sequence management circuit additionally includes registers for storing information for controlling the operation thereof and said second transfer control circuit effects direct memory access transfers between said registers and the input-output bus.

12. An interface as recited in claim 2 wherein the external local memory system comprises an RDRAM memory system and said third connection circuit includes a local RDRAM memory interface circuit and a local memory manager circuit for controlling transfers through said local memory interface circuit in response to said second transfer control circuit, said second transfer control circuit effecting direct memory access transfers between the input-output bus and the RDRAM memory system.

13. An interface as recited in claim 2 wherein first transfer control circuit includes:

(i) a recipient transfer control circuit for controlling the transfer of information from said first connection circuit to said third connection circuit, and (ii) an initiator transfer control circuit for controlling the transfer of information from said third connection circuit to said first connection circuit.

14. An interface as recited in claim 13 wherein each of recipient and initiator transfer control circuits include condition monitors for generating interruption signals in response to conditions within said recipient and initiator transfer control circuits and where said sequence managing circuit additionally includes an interrupt manager circuit for generating an interrupt request to the input-output bus in response to the interrupt signals.

15. An interface as recited in claim 14 wherein said interrupt manager circuit additionally includes an interrupt message table and a selection circuit for selecting one of said messages in response to particular ones of the interrupting signals whereby said interrupt manager circuit transfers the selected message to the input-output bus for transfer to the data system.

16. An interface as recited in claim 15 wherein the information frames received at the interface are sent in a predetermined order and wherein said recipient circuit includes a recipient sequence manager circuit for reassembling the frame data in the predetermined order for transfer to the input-output bus.

17. An interface as recited in claim 16 wherein each information frame has an associated characteristic context and the memory system allocates storage locations for storing the context for a plurality of information frames, said recipient circuit additionally including a recipient sequence cache manager circuit for managing the transfer of context information between the memory system and said recipient sequence manager.

18. An interface as recited in claim 15 wherein information frames to be sent onto the data channel are sent in a predetermined order and wherein said initiator circuit includes an initiator sequence manager circuit for assembling each information frame in the predetermined order.

19. An interface as recited in claim 18 wherein each information frame has an associated characteristic context and the memory system allocates storage locations for storing the context for a plurality of information frames, said initiator circuit additionally including an initiator sequence cache manager circuit for managing the transfer of context information between the memory system and said initiator sequence manager.

20. An application specific integrated circuit interface for interconnecting an external high-speed RDRAM memory buffer, a high-speed data channel that conveys information in serial format as information frames having header and data portions and a data processing system that includes a standard input-output bus having a predetermined format for transfers, said integrated circuit comprising:

(A) a first connection circuit including
 (i) an interface circuit having parallel input and output paths and an arbitration circuit for synchronizing the operation of said interface to the data channel, and
 (ii) a serial-deserializer circuit for converting the information between the serial format on the data channel and a parallel format used in said interface circuit, (B) a second connection circuit for connection to the input-output bus, (C) a third connection circuit for connection to the external memory buffer including
 (i) a local memory interface circuit, and
 (ii) a local memory manager circuit for controlling transfers through said local memory interface circuit, (D) a frame processing circuit connected to said first connection means for dividing and combining the header and data portions of information frames received from and transmitted to the data channel, said frame processing circuit including
 (i) a frame reception circuit for receiving from the interface circuit in said first connection circuit the header and data portions of received information frames,
 (ii) a frame transmission circuit for transmitting to the interface circuit in said first connection circuit the header and data portions of information frames for transfer onto the data channel, and
 (iii) a frame preprocessing circuit for responding to header information from said frame reception circuit and for generating header information for said frame transmission circuit, (E) a sequence managing circuit connected to said frame processing circuit and said second and third connection circuits for managing the transfer of information to and from the data channel through said frame processing circuit, said sequence managing circuit including (i) a first transfer control circuit connected between said frame processing circuit and the third connection circuit for controlling the transfer of the data portions between said frame processing circuit and the external memory buffer connected to said third connection circuit, (ii) second transfer control circuit connected between said second and third connection circuit for transferring data between the external memory buffer and the data system input-output bus, and (iii) a control circuit for effecting direct memory access transfers between said second connection and the external memory buffer.

21. An interface as recited in claim 20 wherein first transfer control circuit includes:

(i) a recipient transfer control circuit for controlling the transfer of information from said first connection circuit to said third connection circuit, and (ii) an initiator transfer control circuit for controlling the transfer of information from said third connection circuit to said first connection circuit.

22. An interface as recited in claim 21 wherein each of recipient and initiator transfer control circuits include condition monitors for generating interruption signals in response to conditions within said recipient and initiator transfer control circuits and where said sequence managing circuit additionally includes an interrupt manager circuit for generating an interrupt request to the input-output bus in response to the interrupt signals.

23. An interface as recited in claim 22 wherein said interrupt manager circuit additionally includes an interrupt message table and a selection circuit for selecting one of said messages in response to particular ones of the interrupting signals whereby said interrupt manager circuit transfers the selected message to the input-output bus for transfer to the data system.

24. An interface as recited in claim 23 wherein the information frames received at the interface are sent in a predetermined order and wherein said recipient circuit includes a recipient sequence manager circuit for reassembling the frame data in the predetermined order in the local memory for transfer to the input-output bus.

25. An interface as recited in claim 24 wherein each information frame has an associated characteristic context and the memory system allocates storage locations for storing the context for a plurality of information frames, said recipient circuit additionally including a recipient sequence cache manager circuit for managing the transfer of context information between the memory system and said recipient sequence manager.

26. An interface as recited in claim 22 wherein information frames to be sent onto the data channel are sent in a predetermined order and wherein said initiator circuit includes an initiator sequence manager circuit for assembling each information frame in the predetermined order from information in the local memory.

27. An interface as recited in claim 26 wherein each information frame has an associated characteristic context and the memory system allocates storage locations for storing the context for a plurality of information frames, said initiator circuit additionally including an initiator sequence cache manager circuit for managing the transfer of context information between the memory system and said initiator sequence manager.

28. An interface as recited in claim 20 wherein said first connection circuit additionally comprises a parallel data path connection and an arbitration circuit for monitoring said parallel and serial data path connections and selecting one of said data path connections for subsequent communications with said circuit.

* * * * *